(12) United States Patent
Wurzer

(10) Patent No.: US 9,317,603 B2
(45) Date of Patent: Apr. 19, 2016

(54) DETECTING CORRELATIONS BETWEEN DATA REPRESENTING INFORMATION

(75) Inventor: Joerg Wurzer, Remscheid (DE)

(73) Assignee: IQSER IP AG, Bassersdorf (CH)

( * ) Notice: Subject to any disclaimer, the term of this patent is extended or adjusted under 35 U.S.C. 154(b) by 271 days.

(21) Appl. No.: 12/715,881

(22) Filed: Mar. 2, 2010

(65) Prior Publication Data

US 2010/0223246 A1     Sep. 2, 2010

Related U.S. Application Data

(63) Continuation of application No. PCT/EP2007/007663, filed on Sep. 3, 2007.

(51) Int. Cl.
    *G06F 17/30*        (2006.01)

(52) U.S. Cl.
    CPC .... *G06F 17/30864* (2013.01); *G06F 17/30997* (2013.01)

(58) Field of Classification Search
    CPC ............... G06F 17/30864; G06F 17/30997; G06F 17/30731
    See application file for complete search history.

(56) References Cited

U.S. PATENT DOCUMENTS

| | | | | |
|---|---|---|---|---|
| 7,213,198 | B1 * | 5/2007 | Harik | 715/234 |
| 2004/0010483 | A1 * | 1/2004 | Brands et al. | 706/45 |
| 2005/0125400 | A1 * | 6/2005 | Mori et al. | 707/4 |
| 2006/0047649 | A1 * | 3/2006 | Liang | 707/4 |
| 2006/0080296 | A1 * | 4/2006 | Morikawa et al. | 707/3 |
| 2007/0282814 | A1 * | 12/2007 | Gupta | 707/3 |
| 2008/0133479 | A1 * | 6/2008 | Zelevinsky et al. | 707/3 |
| 2008/0140643 | A1 * | 6/2008 | Ismalon | 707/5 |

FOREIGN PATENT DOCUMENTS

| | | | |
|---|---|---|---|
| WO | 2005050471 | A2 | 6/2005 |
| WO | WO2005050471 | * | 6/2005 |
| WO | 2007095997 | A1 | 8/2007 |

OTHER PUBLICATIONS

International Search Report; PCT/EP2007/007663; Jan. 24, 2008; 2 pages.

\* cited by examiner

*Primary Examiner* — Dinku Gebresenbet
(74) *Attorney, Agent, or Firm* — Grossman, Tucker, Perreault & Pfleger, PLLC

(57) ABSTRACT

A method for acquiring an interrelation between an item of data representing an item of information of a data inventory and an item of data representing an item of information of a request for an interrelation to the item of data representing an item of information of a data inventory by means of a data processing system with data representing information in a data inventory which can be accessed via a data source comprises a link being established by means of a syntactic comparison and/or by means of one semantic comparison of the item of data representing an item of information of a data inventory with the item of data representing an item of information of the request for interrelation with the item of data representing an item of information of a data inventory. According to the method, results of requests for an interrelation are grouped according to topics.

10 Claims, 30 Drawing Sheets

A :

| IQser (from com.iqser) |
|---|
| -logger:Logger=Logger.getLoggen("IQser") <br> -singleton : IQser = null |
| -IQser() <br> +getInstance():IQser <br> +getContentLinks(in prio:double) <br> +getContentList <br> +getContentList <br> +isContendMarked():boolean <br> +getContentView() <br> +getSettings() <br> +getInstalledProvider():Hashtable <br> +createLink() <br> +createContent(in key:String) <br> +markContent(in b:bolean) <br> +performAction() <br> +removeAction() <br> +removeLink() <br> -init() |

```
PluginManager
(from com.iqser.kernel.plugin)
```
-logger:Logger=Logger.getLoggen(PluginManager.class)

-pluginList:Hashtable=null

+PluginManager()
+getContentProvider(in type:String):ContentProvider
+getContentProviderKeys():Enumeration
+reInit()
-isPlugin(in packagename:String):boolean
-init()
-initPlugins()
-readPluginDir():List
-registerPlugin(in packagename:String)

```
InvalidSettingsExeption
from com.iqser.kernel.plugin
```

+InvalidSettingsExeption()
+InvalidSettingsExeption(in message:String)

| Plugin |
| --- |
| (from com.iqser.kernel.plugin) |
| <u>-logger:Logger=Logger.getLogger(Plugin.class)</u><br>+contentProvider:ContentProvider=null<br>+crawler:Crawler=null<br>-classloader:URLClassLoader=null<br>-libonly:boolean=false<br>-pluginPath:String=null |
| +Plugin(in pluginPath:String)<br>+getClasspath():List<br>+setContentProvider(in contentProvider:ContentProvider)<br>+getContentProvider():ContentProvider<br>+setCrawler(in crawler:Crawler)<br>+getCrawler():Crawler<br>+SetLibonly(in libonly:boolean)<br>+isLibonly():boolean<br>+setSettings()<br>+getSettings()<br>+addClasspath(in libs:List)<br>+init()<br>+startThreads()<br>-loadCrawlerInstance()<br>-loadProviderInstance()<br>-readSettings()<br>+getId():String<br>+setId(in id:String)<br>+getPluginPath():String<br>+setPluginPath(in pluginPath:String) |

| PluginSettings |
|---|
| -requires:List<br>-runtime:List<br>-initParams:Properties<br>-classname:String<br>-crawlerclass:String<br>-id:String<br>-iqserPath:String<br>-name:String<br>-pluginPath:string<br>-vendor:String<br>-type:String<br>-version:String<br>-crawlerdelay:long |
| +PluginSettings()<br>+setClassname(in classname:String)<br>+getClassname():String<br>+setCrawlerclass(in crawlerclass:String)<br>+getCrawlerclass():String<br>+setCrawlerdelay(in crawlerdelay:String)<br>+getCrawlerdelay():long<br>+setId(in id:String)<br>+getId():String<br>+getInitParams():Properties<br>+setIqserPath(in iqserPath:String)<br>+getIqserPath():String<br>+setName(in name:String)<br>+getName():String<br>+setPluginPath(in PluginPath:String)<br>-updateClasspath()<br>+getPluginPath():String<br>+setVendor(in providername:String)<br>+getVendor():String<br>+getRequires():List<br>+getRuntime():List<br>+getRuntimeURL():URL<br>+setType(in type:String)<br>+getType():String<br>+setVersion(in version:String)<br>+getVersion():String<br>+addInitParam(in name:String, in value:String)<br>+addRequires(in plugin:String)<br>+addRuntime(in archive:String) |

```
Crawler
from com.iqser.kernel.crawler
```
-logger:Logger=Logger.getLoggen
(crawler.class.getName)
-repository:Repository=null
-delay:long=0
+Crawler(in delay:long)
+run()

<<interface>>
Repository
(from com.iqser.repository)

+getContentByKey(in id:long)
+getContentByProvider(in provider:String):Collection
+getContentByUrl(in url:String, in provider:String)
+getRelatedContent(in id:long, in maxPriority:double):Collection
+searchContent(in filter:Filter):Collection
+updateContent()
+addContent():long
+addLink(in id1:long, in id2:long, in prio:double)
+deleteContent()
+updateLink(in id1:long, in id2:long, in prio:double)
+isLinked(in id1:long, in id2:long):boolean
+setSettings()

| PluginManager |
|---|
| -logger:Logger=Logger.getLoggen(PluginManager.class) |
| -pluginList:Hashtable=null |
| +PluginManger() |
| +getContentProvider(in type:String):ContentProvider |
| +getContentProviderKeys():Enumeration |
| +reInit() |
| -isPlugin(in packagename:String):Boolean |
| -init() |
| -initPlugins() |
| -readPluginDir():List |
| -registerPlugin(in Packagename:String) |

| *ContentProvider* |
|---|
| -logger:Logger=Logger.getLoggen(ContentProvider.class) |
| +getContentList():ContentList |
| +getContentList(in c:Collection, in 1:Filter):ContentList |
| +getContentName():String |
| +getContentType():String |
| +getView(in c:Content) |
| +version():String |
| +setSettings() |
| +getSettings() |
| +createContent(in c:Content):Content |
| #getLoggen(in cls:Class):Logger |
| #isContentMatched(in filter:Filter, in attributeList:AttributeList):boolean |

| RepositorySettings |
|---|
| -runtime:List<br>-className:String<br>-jdbcDriver:String<br>-jdbcPassword:String<br>-jdbcUrl:String<br>-jdbcUser:String<br>-name:String<br>-providerName:String<br>-repositoryId:String<br>-type:String<br>-veriosn:String |
| +RepositorySettings()<br>+setClassName(in className:String)<br>+getClassName():String<br>+setJdbcDriver(in jdbcDriver:String)<br>+getJdbcDriver():String<br>+setJdbcPassword(in jdbcPassword:String)<br>+getJdbcPassword():String<br>+setJdbcUrl(in jdbcUrl:String)<br>+getJdbcUrl():String<br>+setJdbcUser(in jdbcUser:String)<br>+getJdbcUser():String<br>+setName(in Name:String)<br>+getName():String<br>+setProviderName(in providerName:String)<br>+getProviderName():String<br>+setRepository(in repositoryId:String)<br>+getRepository():String<br>+getRuntime():List<br>+getRuntimeUrl():URL<br>+setType(in type:String)<br>+getType():String<br>+setVersion(in version:String)<br>+getVersion():String<br>+addRuntime(in archive:String) |

| DefaultRepository |
|---|
| -logger:Logger=Logger(DefaultRepository.class) |
| -connection:Connection<br>-isConnected:boolean=false |
| +getContentByKey(in id:long)<br>+getContentByUrl(in url:String, in provider:String)<br>+getContentByProvider(in provider:String):Collection<br>+getRelatedContent(in id:lonf, in maxPriority:double):Collection<br>+getTrackerItems():LinkedList<br>+addContent():long<br>+addLink(in id1:long, in id2:long, in prio:double)<br>+addTrackerItem(in item:TrackerItem)<br>-connect()<br>+deleteContent()<br>+deleteFirstTrackerItem()<br>+deleteLastTrackerItem()<br>-disConnect()<br>+searchContent(in filter:Filter):Collection<br>+updateContent()<br>+updateLike(in id1:long, in id2:long, in prio:double)<br>-getNextId():long<br>-createTableContent()<br>-createTableRelations()<br>-createTableTracker()<br>+isLinked(in id1:long, in id2:long):boolean<br>-init()<br>-loadJdbc(Driver)<br>+setSettings() |

Fig. 10c

DETECTING CORRELATIONS BETWEEN DATA REPRESENTING INFORMATION

CROSS-REFERENCE TO RELATED APPLICATIONS

The present application is a continuation of pending International patent application PCT/EP2007/007663 filed on Sep. 3, 2007, which designates the United States and the content of which is incorporated herein by reference.

FIELD OF THE INVENTION

The present invention relates to a method for acquiring at least one interrelation between at least one item of data representing at least one item of information of at least one data inventory and at least one item of data representing at least one item of information of a request for an interrelation (interrelation request) to the at least one item of data representing at least one item of information of at least one data inventory by means of a data processing system with data representing information in at least one data inventory which can be accessed via at least one data source, wherein the at least one interrelation itself will be acquired as an item of data representing at least one item of information in a data inventory and dynamically as a link between at least one item of data representing at least one item of information of at least one data inventory and at least one other item of data representing at least one item of information of at least one data inventory and/or at least one electronic use of at least one item of data representing at least one item of information of at least one data inventory and will be reproduced by means of an optical and/or acoustical display device of the data processing system, wherein the link will be established by means of at least one syntactic comparison and/or by means of one semantic comparison of the at least one item of data representing at least one item of information of at least one data inventory with the at least one item of data representing at least one item of information of the request for interrelation (interrelation request) with/to the at least one item of data representing at least one item of information of at least one data inventory.

Furthermore, the present invention relates to a data processing system with data representing information in at least one data inventory accessible via at least one data source, which system is designed and/or adapted for at least partially carrying out a method according to the invention.

BACKGROUND OF THE INVENTION

Furthermore, it is an object of the present invention to provide a data processing device for electronic data processing comprising a control and/or computing unit, an input unit and an output unit, which is configured and/or adapted for at least partially carrying out a method according to the invention, preferably using at least a part of a data processing system according to the invention.

Numerous embodiments of methods, systems and devices for electronic data processing are known from the state of the art, in particular from WO 2005/050471 A2, the disclosures of which are hereby explicitly referenced.

Methods, data processing systems and/or data processing devices of the kind mentioned in the beginning are used within the scope of search applications or routines for instance by operating systems and/or by so-called search engines, as well as within the scope of organisation, provision and/or delivery of information.

Usually contents are machine-processed as data representing information of a data inventory, in particular in order to be placed at the disposal of users, or to serve users, as technical means for solving tasks. Data inventories in the sense of the invention are simple, universally usable, persistent data objects containing, like files and/or documents in operating systems or databases, in particular structural, content, and administrative information, as required.

In data processing systems and/or data processing devices the data inventories are usually accessible to a data processing system and/or a data processing device via at least one data source, usually a data carrier available within a data processing system or interfaceable or connectible via a communication network, for instance a hard disc or similar data recording means.

Operating systems operate with a hierarchical order of files, for instance in their so-called file system. Herein, the files are arranged as a data inventory in directories in a tree structure. Navigation in the files usually occurs along an Aristotelic logic via the names of the individual directories down to a file. Herein, the process of navigation can comprise several steps and furthermore involves the problem of an unambiguous assignment. Moreover, in operating systems, the administration of files is separated from the administration of data which are exclusively accessible via application programs accessing databases or file-based data structures, as for instance XML. Normally, the separation occurs in accordance with the technical implementation or realisation of the persistence of the respective data.

In database-supported applications, relational databases managing static connections of tables provided with data have been used hitherto. Due to the used static connections in the tables managed by search engines, modifications in the data inventories cannot be acquired at all or only in a limited manner and with a delay. The evaluation or use of the data must be determined in a foresighted manner.

Usually, search engines allow users to search data inventories only for keywords or a Boolean combination of keywords. Precise search requests, as for instance the calling of invoices or the like from a particular period of time or similar queries are not possible.

Moreover, data processing systems usually operate with a static—i.e. firmly preset—hierarchically structured menu structure providing the user with a selection of possible functions for operating the data processing system. In operating systems such as for instance MacOS X of the company Apple, so-called pop-up menus are used in addition. These are also hierarchically structured menu structures which, depending on the installed application programs, however, can be supplemented at least partly by corresponding menu items for starting or calling individual application programs and/or functionalities of the same. Apart from the supplementability of the menu structures, the latter are nevertheless statically hierarchically structured in their use. The previously existing static hierarchical structuring of menu structures in data processing systems can consequently not, or only to a limited extent, fulfil a user's preferences of use. Taking the respective context of use into account by means of the menu structures, wherein in particular those menu items are offered in a menu which make sense or are reasonable in the context of the situation or of the called contents, is not possible, in particular not due to the static hierarchical structure of the menus.

Synchronisation of data representing information in data inventories between different data processing devices jointly using the data inventories—in particular in view of the increasing dissemination of data processing devices for mobile use such as so-called PDAs (PDA: Personal Digital Assistant)—is an important part of data processing systems and is integrated into data processing systems for instance in the form of so-called PIM systems (PIM: Personal Information Management). The functionality of synchronisation, however, has previously been restricted to a purely manual selection of information to be synchronised. For instance, a user can only select by manual input which, or which part of, the contact addresses managed by the data processing system he wants to synchronise. A closer or more detailed specification with regard to a limitation of content of the information to be synchronised is not possible, in particular not as an automated process which independently adjusts to the user's requirements.

In view of this state of the art, it is the object of the present invention to improve the acquisition of interrelations between data representing information avoiding the described disadvantages, in particular with regard to method, scope and handling of the acquisition of interrelations as well as the use of the acquired interrelations, in particular in consideration of the respective user-individual uses of the interrelations.

SUMMARY OF THE INVENTION

For the technical solution the present invention proposes a method for acquiring at least one interrelation between at least one item of data representing at least one item of information of at least one data inventory and at least one item of data representing at least one item of information of a request for an interrelation (interrelation request) to the at least one item of data representing at least one item of information of at least one data inventory by means of a data processing system with data representing information in at least one data inventory which can be accessed via at least one data source, wherein the at least one interrelation itself will be acquired as an item of data representing at least one item of information in a data inventory and dynamically as a link between at least one item of data representing at least one item of information of at least one data inventory and at least one other item of data representing at least one item of information of at least one data inventory and/or at least one electronic use of at least one item of data representing at least one item of information of at least one data inventory and will be reproduced by means of an optical and/or acoustical display device of the data processing system, wherein the link will be established by means of at least one syntactic comparison and/or by means of one semantic comparison of the at least one item of data representing at least one item of information of at least one data inventory with the at least one item of data representing at least one item of information of the request for interrelation (interrelation request) with/to the at least one item of data representing at least one item of information of at least one data inventory, wherein results of requests for an interrelation (interrelation request) are grouped according to topics.

The requests for an interrelation between the contents of data representing information, interrelation requests in the sense of the present invention, are advantageously themselves information and/or actions of representing data. Accordingly and according to the invention, in general interrelations between two successive contents will be advantageously acquired as data representing information of one or two data inventories.

The invention is based upon the knowledge that the grouping of results of requests for an interrelation (interrelation request) enables to further improve and optimize interrelation requests, in particular with respect to the usability for the user of an acquisition of interrelations according to the invention.

An especially preferred embodiment of the invention provides that the interrelation request is realised as a request addressed to a search engine. Herein, a search engine in the sense of the invention is in particular a program for researching documents and/or data records—which are, in the sense of the present invention, one item of data representing at least one item of information of a data inventory—which are provided or held ready by means of a computing device—also called computer—or in or via a computer network, in particular the internet or an intranet. In the scope of a use of the method according to the invention with respect to the interrelation request for or with a search engine a keyword index will be advantageously created for the document basis—which is, in the sense of the present invention, a result of a search request or an interrelation request—in order to respond to search requests via keywords—which are, in the sense of the present invention, one item of data representing at least one item of information of the interrelation request—by means of a hit list arranged according to relevance. After input of one or more search terms—which are, in the sense of the present invention, an item of data representing an item of information of the interrelation request—a list of links to possibly relevant documents or data records—which are, in the sense of the present invention, an item of data representing at least one item of information of a data inventory—will be delivered.

Thus, an altogether self-learning solution will be realised according to the invention. Altogether, the acquisition of interrelations between data representing information has been improved thereby, in particular with respect to the manner, scope as well as handling of the acquisition of interrelations as well as to the use of the acquired interrelations, in particular in consideration of the respective groupings of the results of the interrelation requests. Herein, interrelations can be managed as knowledge according to the invention.

Herein, the method according to the invention puts the knowledge into practice that knowledge is created by connecting contents. In contrast to a use of term networks which are encoded in a so called Topic Map according to ISO/IEC 13250 and are for instance created by consulting enterprises with respect to areas of business or by verticalised knowledge management solutions of software manufacturers, the invention provides a self-learning solution which adapts itself to the requirements and preferences of the respective consumer or user. Accordingly, the functionalities of the method according to the invention can be simply integrated without any problems into existing solutions, in particular data processing systems and/or data processing devices. Costly and training intensive introductions of a solution according to the invention into existing or new projects can be dropped.

The solution according to the invention enables a user to get easily and quickly from one item of content to other contents linked via interrelations. Since advantageously, all contents, in particular in groupings according to the invention, are repeatedly connectable via interrelations, a navigation within the scope of an interrelation request can advantageously also lead back to the starting point of the request, i.e. to the interrelation request itself. In this manner, the user can advantageously recognise contexts, in particular with or between his uses, which are relevant for instance for his current focus of interest. In a fixed, static hierarchical order of data processing systems, as it exists for instance in operating systems and their application programs usually using tree structures to select contents, this is not possible, since these do not allow a consideration of new order structures.

While otherwise, users of data processing systems enter data via input masks provided by the data processing system, the solution according to the invention advantageously makes it possible to describe data in accordance with a current requirement of the user. So for instance, the solution according to the invention does not rigidly determine the description of an address or a project, as it is otherwise usual, but due to the dynamic data management according to the invention and the design of a corresponding graphic user interface, it enables the user to use it in an extremely flexible and individual manner.

An advantageous embodiment of the invention is characterized in that for topically grouping results of requests for an interrelation (interrelation request), in particular an interrelation request used as search request sent to a search engine retrieves, preferably step by step for each result of a request for an interrelation (interrelation request), data representing information linked to the result and if at least one link which is also a result of a request for an interrelation (interrelation request) is existent, a group will be generated or created in which the links are acquired. A preferred embodiment of the invention provides that for already grouped results of the request for an interrelation (interrelation request) no link will be retrieved. For already linked results of an interrelation request, the corresponding links do not have to be considered any more according to the invention, since these ones are already linked and thus grouped according to the invention.

Another embodiment of the invention provides that the grouping will be provided with an identification which is formed by the three longest and/or most frequent data representing information of the grouped results. The identification is preferably a name of alphanumeric characters.

In another most preferred embodiment of the invention grouped results of requests for an interrelation (interrelation request) will be reproduced by the optical display device of a data processing system in form of stacks representing the respective group, preferably in graphically animated form.

In another advantageous embodiment of the invention it is provided that at least one word of a list made on the base of a full text (list of words) and comprising words contained in the full text will be used as the at least one item of data representing at least one item of information of the request for an interrelation (interrelation request).

An advantageous embodiment of the invention provides that the words on the list (list of words) of the words contained in the full text will be arranged in ascending manner in accordance with the frequency of their presence in the full text and the arranged words will be used in consideration of the frequency of their presence in the full text as the at least one item of data representing at least one item of information of the request for interrelation (interrelation request).

In another embodiment of the invention it is provided that a pre-determinable number of the words arranged on a list (arranged list of words) in accordance with the frequency of their presence in the full text will be acquired and the words of the list (arranged list of words) will be used as the at least one item of data representing at least one item of information of the request for an interrelation (interrelation request). Advantageously, the list (arranged list of words) contains the words with the lowest frequency of their presence in the full text. In another embodiment of the invention the words are advantageously arranged in an ascending manner in accordance with the frequency of their presence in the full text. The pre-determinable number is preferably limited to up to 32, in particular since thanks to the pre-determinable number the number of attributes which are usable for an interrelation request and can be preferably logically connected to each other can be defined and furthermore—as it has been found empirically—the performance of the solution according to the invention in use by data processing systems can thus be optimised.

According to another proposal of the invention the words of the list are at least partially, preferably completely—i.e. the entire list of words—used in parallel as the at least one item of data representing at least one item of information of the request for an interrelation (interrelation request). Herein, the words of the arranged list of words are advantageously connected to each other in a logical manner, preferably by means of a Boolean logical addition, and the logical addition will be used as the at least one item of data representing at least one item of information of the request for an interrelation (interrelation request). As result the interrelation request then delivers a similarity value, preferably via a search engine. The similarity value is advantageously a percentage number with respect to the similarity, wherein for a similarity value of 100% all the words from the arranged list of words that have been used as attributes for the request in the requested context, especially preferred between two full texts or full text documents, occur and/or are relevant and for a similarity value of 0% none of the words from the arranged list of words that have been used as attributes for the request in the requested context, especially preferred between two full texts or full text documents, occurs and/or is similar or is relevant with respect to the similarity.

An alternative and/or supplementing embodiment of the invention advantageously provides that the words of the list will be used one after the other as the at least one item of data representing at least one item of information of the request for an interrelation (interrelation request).

Advantageously, the connections are acquired like, and preferably with, the dynamically acquired interrelations. In contrast to relational databases where connections of tables provided with data are managed, the solution according to the invention creates links of the acquired interrelations dynamically, preferably in n-to-n relations, wherein the interrelations are advantageously obtained and maintained, i.e. in particular kept up to date, independently according to the method.

According to the invention advantageously all data inventories existing in and/or connected with or integratable into the system are indexed. From the user's point of view, a dissolution of the otherwise existing separation between database and file system, as for instance in search engines, will thus be achieved. The solution according to the invention thereby enables a search of contents independent of the technical realisation of the persistence of data. Herein a quasi-combination of indices and databases is created according to the invention enabling different search options by interrelations, in particular an integration of precise search queries and full-text searches. Search queries are analysed and converted for an internal query of the data sources.

The solution according to the invention advantageously permits an integration of data sources without having to replicate data or to use resources for redundancies. For this, a data processing system according to the invention advantageously comprises a structure which makes it possible to integrate data sources without having to replicate data or to use resources for redundancies (plug-in structure of the data processing system). The involvement of data sources for data migration otherwise requiring a high development effort and large system resources can therefore be advantageously omitted.

In accordance with another proposal of the invention, the solution according to the invention also takes local data inventories into account which can for instance be shared by different users for use in a computer network, e.g. various employees in a company network, in particular, a client-server network. Contents and their interrelations can thereby be used in a company network for instance for market research and/or competition analyses or similar applications.

In another advantageous embodiment of the invention, the connection is created by a syntactic comparison between the at least one item of data representing at least one item of information of the request for an interrelation (interrelation request) and the at least one data inventory. The particularity of the art according to the invention is a syntactic comparison on the basis of rules (keys) that can be respectively described in insertable modules, so-called plug-ins. This has two crucial advantages: On the one hand, valid interrelations specified by the user (e.g. business rules) can be defined and applied to the data inventory. At the same time, this allows for a flexible data structure. On the other hand, interrelations between items of information and options for action (dynamic functions) can be created by the rules. According to the invention, a solution is used here, in which information about actions on the part of a user or automatic processes is provided to all system components (plug-ins) managing data sources in order for them to trigger actions or changes to the data inventory themselves, if required. The syntactic analysis is advantageously applied in combination with other analyses in order to realise quick results and an immediately usable overall system.

Another advantageous embodiment of the invention provides that the connection is created by a semantic comparison between the at least one item of data representing at least one item of information of the request for an interrelation (interrelation request) and the at least one data inventory. Within the scope of the semantic comparison, a semantic network is herein advantageously created from which interrelations can be acquired.

In a particularly advantageous embodiment of the invention, the various possibilities for the creation of connections are applied in combination. Unlike neural networks, the solution according to the invention works with a combination of syntactic and/or semantic analytic processes in order to achieve a high learning speed.

According to an advantageous proposal of the invention the connection is created by manual input, preferably by a select input.

In another particularly advantageous embodiment of the invention, other comparisons for the acquisition of connections can be integrated into the data processing system according to the invention. In this manner, the user can for instance integrate other analytic procedures and/or methods in addition to the mentioned possibilities for acquisition of connections and accordingly expand the data processing system by these according to the user's individual requirements.

Another advantageous proposal of the invention is characterised by at least one electronic use of an item of data representing at least one item of information of at least one data inventory as an item of data representing at least one item of information of the request for an interrelation (interrelation request). A particularly advantageous embodiment of the invention is characterised by an acquisition of electronic uses of data representing at least one item of information of at least one data inventory in accordance with time and/or frequency and use of this acquisition as the at least one item of data representing at least one item of information of the request for an interrelation (interrelation request). Another advantageous embodiment of the invention is characterised by at least one acquisition of an interrelation as electronic use of an item of data representing at least one item of information of a data inventory. Another embodiment of the invention is characterised by the use of at least one reference to a data inventory comprising data representing at least one item of information. By these measures, for instance the use of a file with an application program, advantageously either individually or in combination, can be acquired as an interrelation. Scope and handling of the solution according to the invention can thus be further improved, and user applications can be further individualised. For the analysis, advantageously actions, time and sequence of the user and results of data modifications are logged according to the invention. The data modifications are advantageously verified by a so-called crawler.

The acquisition of interrelations advantageously occurs in a weighted manner. In this manner, the dynamics of acquisition of interrelations can be advantageously further increased or reduced. In a preferred embodiment of the invention, the weighting of interrelations of at least one interrelation already acquired as an item of data representing at least one item of information in a data inventory is modified in dependence on the weighting of interrelations of a subsequently acquired interrelation; preferably the weighting of interrelations is increased (incremented) or reduced (decremented). In a particularly preferred embodiment of the invention, the weighting is not only realised in accordance with a percentage hit accuracy of a search query, but on the basis of the semantic network formed by dynamic acquisition by the solution of the invention, which network is automatically and continuously optimised by numerous parameters, in particular by continuous updating of the acquired interrelations. Details of this iterative process comprising several bifurcations result in connection with the following description of the flow charts shown in the figures of the exemplary embodiments, in particular from FIG. 14.

Advantageously, at least one acquired interrelation is reproduced, preferably by an optical and/or acoustical display device of the data processing system according to the invention or of a data processing device according to the invention, respectively. In accordance with another advantageous proposal of the invention, the weighting of the acquired interrelation is reproduced together with it.

In another embodiment of the invention, weightings are provided with an expiry period in order to down-grade interrelations in dependence on time. Since each user will use the solution according to the invention with different intensity, it is appropriate to use a meter for the expiry period which uses an action as the smallest unit of time. In this case, an action is the calling of an item of content, preferably including processing of the same, and/or the creation of a new item of content from the data processing system. In another embodiment of the invention, the period within which a user has used an item of content, for instance viewed one, is used for determining the expiry period. The expiry period of a weighting of an interrelation is advantageously extended the longer and/or the more often the user has occupied himself with an item of content, since its significance for the user is or must be correspondingly higher.

Moreover, the present invention relates to a data processing system with data representing information in at least one data inventory that is accessible via a data source and that is configured and/or adapted for at least partially carrying out a method according to the invention.

Another advantageous embodiment of the invention is characterised by a graphic user interface for entering and/or reproduction of interrelation requests, connections, interrelations and/or weightings of interrelations. The graphic user interface is advantageously furthermore designed and/or adapted for entering, modifying and/or reproducing data representing information in at least one data inventory. The user interface advantageously provides a graphic user interface which enables action-oriented navigation. This means that in place of possible functions in hierarchically structured menu structures otherwise offered for selection to the user, options for action are offered to the user within the scope of the invention which are reasonable and make sense in the context of the situation or contents called, respectively. In accordance with a particularly preferred proposal of the invention, action-oriented navigation uses a binary basic structure which enables input of contents on the one hand and output of contents, on the other hand. This action-oriented, binary navigation is advantageously realised with cross-device validity, i.e. independently of the respective data processing device.

In a particularly preferred embodiment of the invention, the graphic user interface partitions the optical display area available for reproduction by means of a display device into three areas, wherein the result of a selection of data representing information is reproduced in a first area, an item of information selected from the selection in the first area is reproduced in a second area with a display, and the at least one interrelation is reproduced in the third area. The item of information in the second area selected from the selection in the first area is preferably reproduced as a preview or as full display of the item of information. The display area can also be provided in the form of a window by the display device. Another proposal of the invention is characterised by a horizontal or vertical layout. The size of the areas can be advantageously set or adjusted.

In another advantageous embodiment of the invention, reproduction occurs at least partly in selectable form, i.e. the reproduced interrelations themselves are for instance designed as menu items for options for action and/or as connections in the form of a link and can be used by selection, for instance by so-called "clicking-on".

Contents or documents comprising contents are advantageously reproduced within the scope of a preview by the data processing system. In this manner, the possibilities of orientation for the user in the interrelations and contents are further improved. During navigation or controlling, the preview is advantageously reproducible by data inventories, such that the user can gain a quick overview of interrelations. This preview advantageously contains a summary of the content, for instance an Internet page reduced with regard to the elements or components shown, or a summarised text. Thereby, otherwise existing restrictions, which are present for instance in operating systems giving a preview of documents in the form of small pictures (so-called thumbnails), in the form of beginnings of texts, or in the form of program or document symbols (so-called icons), can be eliminated in accordance with the invention.

In a particularly preferred embodiment of the invention, the data processing system according to the invention is used for dynamic organisation of information and/or processes, preferably within the scope of a software running on a computer.

The data processing system according to the invention is advantageously part of a database application, or at least usable together with a database application.

Furthermore, the subject of the invention relates to a data processing device for electronic data processing comprising a control and/or computing unit, an input unit and an output unit which is configured and/or adapted for at least partially carrying out a method according to the invention, preferably using at least a part of a data processing system according to the invention.

In another advantageous embodiment of the invention, a data processing device for electronic data processing comprising a control and/or computing unit, an input unit and an output unit is provided, characterised by a use of a data processing system according to the invention.

In an advantageous embodiment of the invention, the data processing device is designed as a mobile terminal, preferably as a mobile terminal which can be used and operated in mobile networks. Particularly preferred is an embodiment of the data processing device as a mobile telephone.

The data processing system according to the invention is advantageously configured in such a way that it can be run under a Java VM, so that the data processing system can principally be used on all mobile terminals. In a particularly preferred embodiment of the invention, the data processing device supports the special ergonomics of the data processing system.

A preferred embodiment of the solution according to the invention advantageously comprises and realises the following procedures, systems and/or devices for acquisition of interrelations between data representing information:

Based on findings of linguistics, epistemology and neurology, interrelations between contents (data representing information) are acquired, wherein the interrelations are acquired dynamically as modifiable, advantageously increasable or reducible n-to-n connections (n: natural, whole number) in accordance with neuronal patterns or associations in the human brain, respectively.

Just like the human brain condenses and processes stimuli of its sensory organs as mental presentations to mental representations—for instance, the human brain derives a movable object from synchronically activated stimuli by means of the visual system of perception—interrelations between contents (data representing information) are acquired in the solution according to the invention. In iterative processes, information or contents, respectively, can be condensed to knowledge on the basis of the correspondingly acquired dynamic interrelations. Furthermore, according to the invention, the interrelations acquired in this way can themselves be used as new content in the form of data representing information, for instance as options for action which are offered to the user to select from, or enter into process controls or the like within the scope of automated processes. Herein, the solution according to the invention is advantageously pragmatic and self-organising, so that configurations by the user are not required. At the same time, the solution according to the invention still allows open controls by the user.

Within the scope of the acquisition of interrelations, different methods for producing, modifying and dissolving dynamic n-to-n connections are advantageously applied in combination with each other, in particular connections by manual inputs, connections by syntactic comparisons and/or connections by semantic comparisons. Furthermore, mathematical-statistical analytical procedures can be used to acquire interrelations. The interrelations acquired by connections are advantageously provided with a weighting. Herein, this weighting is advantageously realised with values, preferably values between 0 and 1, corresponding to no interrelation (value 0) or an immediate interrelation (value 1).

Connections of interrelations by manual inputs of the user can be provided with the greatest possible weighting value, in the present invention 1, i.e. the weighting of the connection will get the highest and fixed value. Herein, in particular the ergonomics of action-oriented logic described in more detail in the following is used. Alternatively, a smaller value may be set in order to let the connection enter into the semantic network.

With connections of interrelations by syntactic comparisons and/or rules, the contents (data representing information) of files and/or databases or defined parts of contents are searched as a data inventory for matching words, word components or character strings which correspond to the contents (data representing information) of the interrelation request. By this quick and valid connection which provides a kind of basic structure for interrelations, the independent acquisition of interrelations, the so-called "self-learning" of the solution according to the invention, is accelerated.

With connections of interrelations by semantic comparisons, dynamic interrelations are advantageously acquired based on, or by means of, the sequence of contents (data representing information) of data inventories (files and/or databases) and/or the sequence of uses of contents (data representing information) of data inventories (files and/or databases). Herein, the solution according to the invention advantageously uses findings of implicit semantics. The semantics are called implicit because in the present case, it is not explicitly modelled by a conceptual network (topic map) or semantic rules of linguistics, but based on the knowledge that interrelations between contents such as meanings within a language are not created by definition, but developed dynamically by the use of the same. Meanings of a language are thus developed by the use of the language, and interrelations between contents according to the invention by the use of these contents. To that extent, semantics cannot be abstracted from language practice or, in the present case, from the contents.

In the technical realisation of connections of interrelations by semantic comparisons, each dynamic connection is given an intrasystem value between 0 and 1, wherein the value 0 shows that there is no interrelation, and the value 1 shows that there is a direct interrelation, which was created manually or by syntactic comparisons. The solution according to the invention logs all actions of the user with the data processing system or the sequence of all called or used contents, respectively, for instance edited contents. As already explained, contents are understood to be data representing information of an arbitrary data inventory, for instance of a file and/or a database, which can originate from different data formats and from different data sources.

If two items of content succeed each other, a latent connection is created. If this succession appears repeatedly, the connection is strengthened. Each connection is advantageously also provided with an expiry period of a pre-determinable time unit, wherein the value of a connection is attenuated in a time unit and finally tends toward the value 0 after several time units.

Beyond the direct succession of two items of content, the solution according to the invention advantageously provides groups of content calls which form a pattern. Herein, a pattern means a succession of content calls which recur independent of their order. The patterns can be of different sizes and comprise different numbers of items of content per succession and advantageously form a so-called cluster which forms a subject on a semantic meta level beyond the interrelation. Such a subject could in turn be designated as an interrelation request with the aid of a syntactic comparison for acquisition.

Furthermore, the solution according to the invention is able to determine the relevance of acquired interrelations for the respective user on the basis of the semantic comparison. In this manner, the solution according to the invention avoids an excessive flood of information and can answer interrelation requests of the user more precisely and in a more focussed manner. The relevance can furthermore be advantageously used by the solution according to the invention for a self-organising maintenance of the data processing system, for instance in order to remove data which are not used, which are old and/or unimportant or have become unimportant which would otherwise burden the data processing system.

With interrelation connections by semantic comparisons, it is possible by an appropriate configuration to advantageously analyse contents and/or uses of contents in accordance with individual interests of a user, in the following referred to as interest or action analysis.

An interest analysis examines which content categories the user preferably needs in the respective context. In this manner, the solution according to the invention trains the user-specific rules for the syntactic analysis of contents. If the user for instance needs invoices and orders when calling a set of addresses, these relations are will be advantageously displayed by the data processing system according to the invention. The solution according to the invention understands content categories to be contents which are formally similar, for instance electronic mail (e-mail), addresses, invoices, orders, project plannings, appointments, and the like. Just as with semantic comparisons, the results of the interest analysis are represented by a dynamic network the relations of which can be increased or reduced.

Thanks to this interest analysis, it is possible to restrict the contents, uses of contents and/or aspects of a subject of contents which are interesting for the user to a narrower focus. A subject in this context is a group of contents which—as explained above—has been identified and summarised within the scope of a semantic comparison or which results from a queried and acquired interrelation. The interrelation request can advantageously be initiated in different manners, for instance by dynamically acquired uses of the data processing system by the user or by manual or—if language recognition and natural language interpretation by means of the data processing system according to the invention have been integrated—oral interrelation requests placed with the data processing system, for instance in a search field provided for this purpose by a graphic user interface for controlling the data processing system according to the invention.

An action analysis examines which uses of contents the user preferably needs in the respective context. Therefore, not the contents, but the actions associated with the contents, which are advantageously processed into options for action in dependence on variables such as content, type of content or subject by the solution according to the invention, are acquired in a networked manner. For each called content or interrelation request, the solution according to the invention is able to dynamically offer options for action which make sense to the user in the respective case or which are particularly probable based on his usual actions. So for instance, it makes sense that a drawn-up invoice is entered in a corresponding data processing system or a like application, or that a reply to an email can be created.

With an advantageous analysis in accordance with patterns in the contents and/or their uses, a so-called pattern analyser is advantageously used in the present case, a process which searches unstructured contents for patterns which it recognises as independent content or which it uses for a summary of contents.

The so-called pattern analyser recognises for instance an address or a picture in the text and can use this information in order to make it available as independent content. In this manner, Internet pages can be used for an automated address research. The pattern analyser thereby advantageously takes up the concepts of the described semantic analysis according to the invention. Selected contents, for instance emails, are advantageously automatically evaluated and provided as structured information.

As already explained above, subsequent to the semantic analysis, the analyser verifies whether there are connections between the links and whether a meta link can be established.

For the creation of meta contents or identification of subjects, respectively, the semantic analyser verifies at first how many links there are to a content. When a critical number has been reached which is dynamically definable, and if there is no meta content yet which contains the set of links of the content examined by the analyser as a subset of its links, a new meta content will be created. For this purpose, the individual items of content are merged and summarised. This can be advantageously done by means of the pattern analyser or other analytic procedures or methods.

If a subject exists and the connections fall below the critical number, the meta content will be deleted. Meta contents can advantageously be managed via a corresponding plug-in.

Principally the solution according to the invention is able to integrate unlimited data inventories in the form of files and/or databases of different formats and from different data sources into the data processing system. Herein, the data sources should neither be imported nor modified, in order to remain advantageously functional and usable within their original system context. This serves the security of investment and furthermore accelerates or supports an implementation of the solution according to the invention. For this purpose, the data processing system according to the invention advantageously comprises a central data management—in the following referred to as "repository"—which contains references to the various data inventories and data sources. Herein, not the complete contents are memorized, but only references to the respective data. In this manner, double data management can be avoided.

As already explained above, the solution according to the invention is able to integrate data representing information as contents from different data inventories—both databases and files—in different formats from the most different data sources, for instance via the Internet or a local company network, identify their structures and identify the detected interrelations between the contents or content components, for instance the sender of an email. Herein, the individual content components are advantageously related to corresponding content components of other contents. By this measure, the solution according to the invention is accelerated with regard to searching contents of data inventories—in particular also full texts—for words, word components and/or character strings.

This process of crawling contents of data inventories for words, word components and/or character strings—subsequently also referred to as "crawler"—is advantageously executed by a data processing system according to the invention in the background of the application of the solution according to the invention and periodically searches for new and modified contents which are preferably temporarily held for analysis in temporary files. As soon as the analysis is completed, the temporary files are deleted.

BRIEF DESCRIPTION OF THE DRAWINGS

Further details, characteristics and advantages of the invention are explained in the following in more detail based on the description of the exemplary embodiments shown in the figures of the drawing. In these figures.

DETAILED DESCRIPTION OF THE INVENTION

The hardware respectively software concept realising an acquisition according to the invention of interrelations between data representing information including the user guidance results in particular from the context-sensitive management of information according to the invention and/or actions in such a way that a verifiable interrelation is provided.

The data processing system consists of several components which in turn contain further sub-components. In the following, the respective main components are described in connection with FIGS. 1 to 13 to provide a general overview of the architecture of the data processing system. The background of the architecture presented and described here is that the components do not imperatively have to be executed within one application, but a division into several applications and systems is also possible. In this manner, both a so-called standalone and a so-called client/server application are supported.

Figure 1:
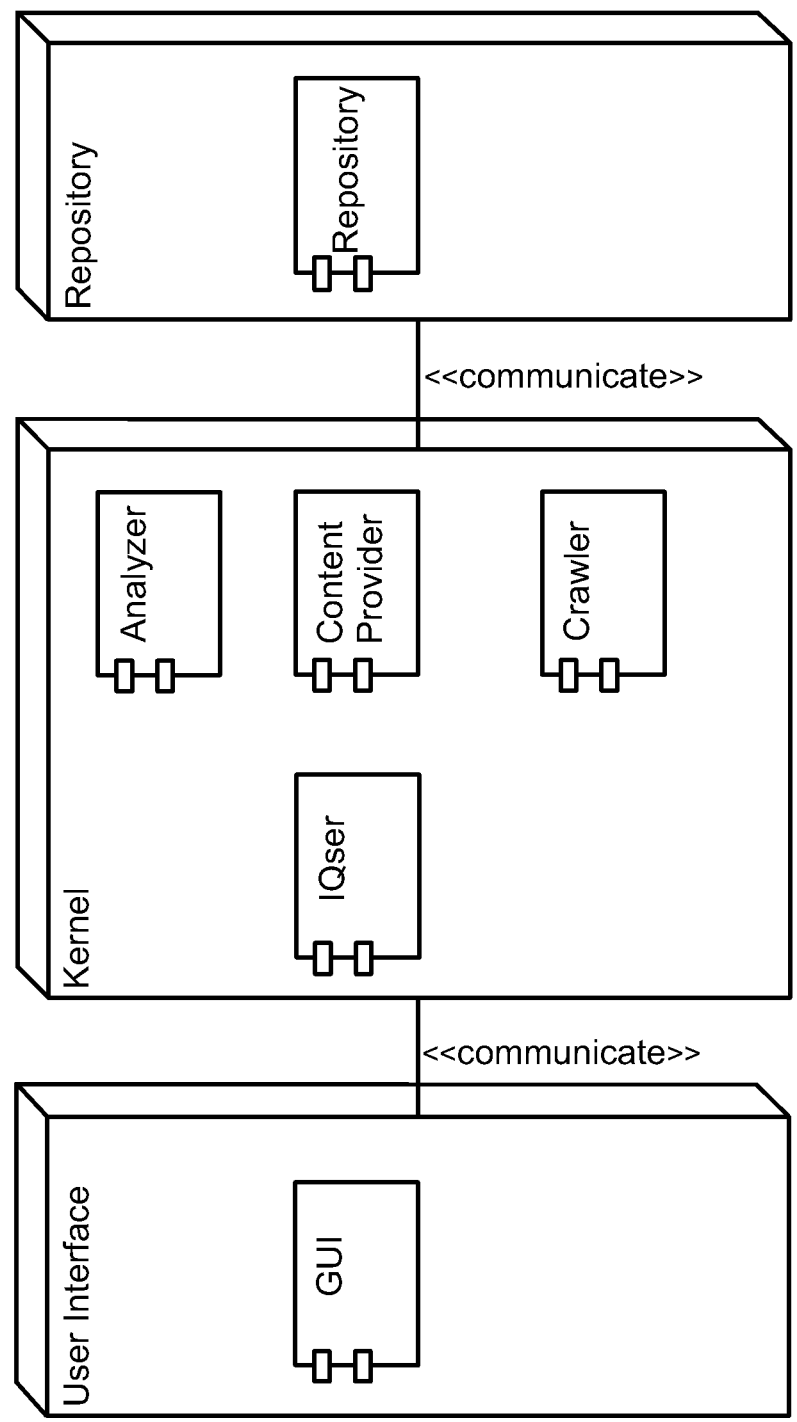
FIG. 1 shows a block diagram of the principal components of a data processing system according to the invention.

As can be seen from FIG. 1, the data processing system comprises a user interface, a kernel and a so-called repository.

The user interface (subsequently referred to as GUI) is the interface to the user. Herein, the user interface (GUI) is realised and designed in such a way that the ergonomic requirements of the user are completely met. In the present case, the user interface (GUI) is platform- and device-dependent, respectively, and is correspondingly individually adjusted to the capabilities of each platform or data processing device. In the present case, for instance implementations of the user interface (GUI) for PCs, PDAs, web or HTML applications, mobile telephone or WML/WAP applications are provided which are preferably realised by means of, or as, JAVA applications.

The kernel is the central application core of the data processing system, in which all components converge and are connected with each other. The kernel itself is divided into further sub-components, subsequently referred to as IQser, content provider, crawler, logger or tracker (not explicitly shown in FIG. 1), respectively, or analyser.

Figure 2:
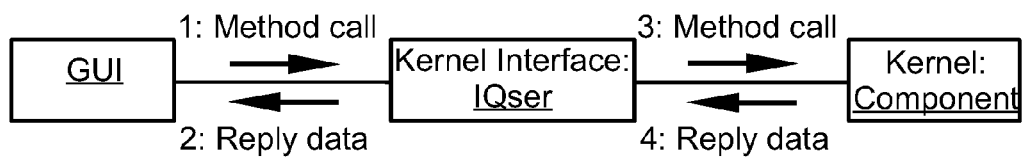
FIG. 2 shows a principal exemplary embodiment of a communication between selected components of the data processing system according to the invention according to FIG. 1.
Figure 3:
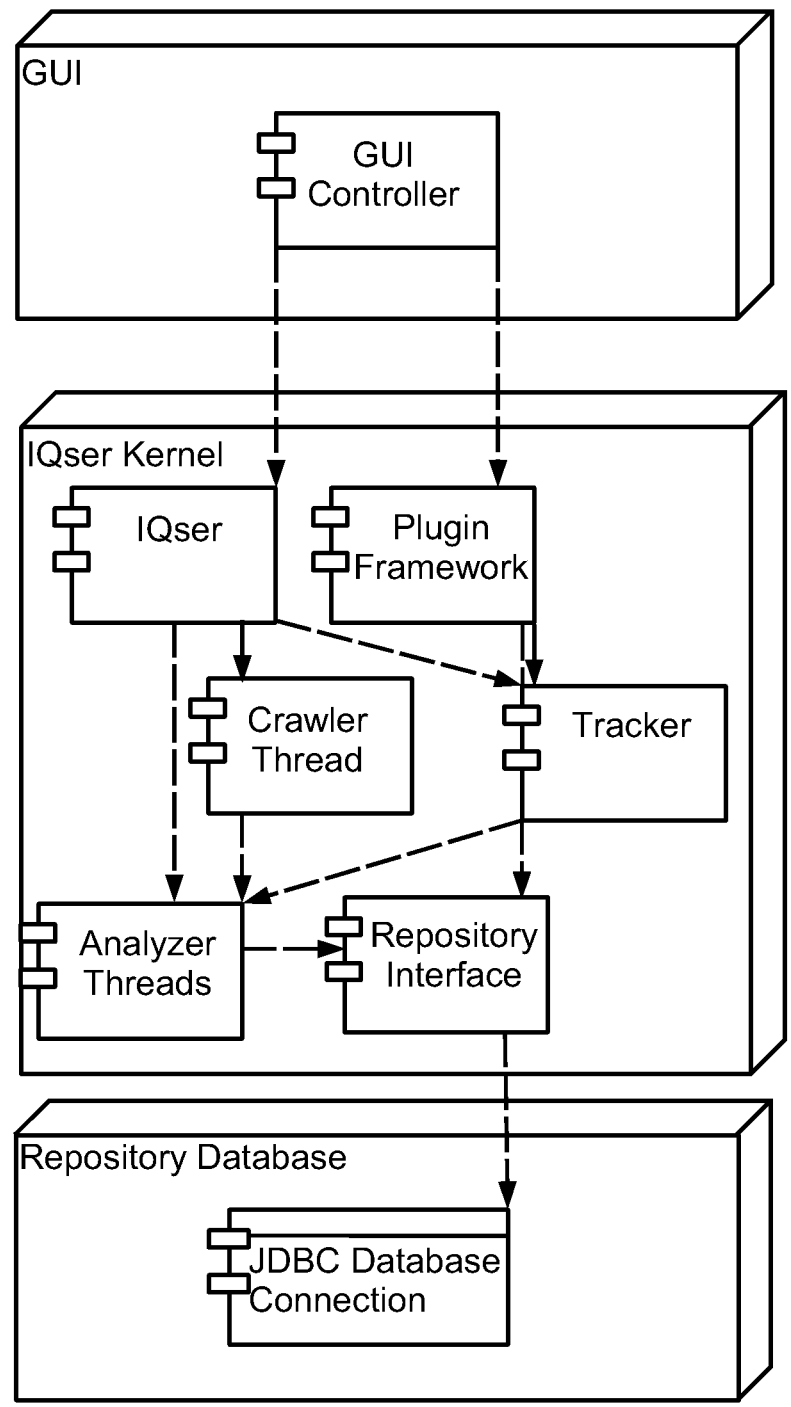
FIG. 3 shows a block diagram of another principal exemplary embodiment of a communication between selected components of the data processing system according to the invention according to FIG. 1.

The kernel provides an interface to the graphic user interface (GUI), and is subsequently referred to as IQser component. Herein, the respective method calls of the user interface (GUI) are forwarded to the respective appropriate components and processed correspondingly before return to the user interface (GUI), if required, as can be seen from the principle shown in FIG. 2. The respective requested tasks according to FIG. 2 are executed by the respective components provided for this purpose. FIG. 3 provides an exemplary overview of the connections among the individual components.

Furthermore, the IQser component is the controller unit which controls the accesses to the repository or repositories and the crawler and analyser processes. Furthermore, in the present invention the IQser component realises the object of integrating the respective content provider into the system.

The content provider component is an abstract component. In the present invention, it is a framework which makes it possible to integrate any data source into the data processing system. This renders the overall system very flexible, and the latter can be integrated into the user's infrastructure.

The task of the crawler component is to search for new content objects or for modifications of existing objects. All modifications or innovations are synchronised in the repository, so that the repository is always up to date. The process realised by the crawler component runs in the background and is started via a freely definable interval.

The task of the logger or tracker component not explicitly shown in FIG. 1 is to log any activity of the user with a content (subsequently also referred to as content object). This logging is required in order to acquire certain processing or usage patterns of the user in relation to different content objects in the analyser at a later time, and to create or delete less relevant interrelations (so-called "weak links") between objects, if required.

In the present invention, the analyser component runs as an independent process in the background of the data processing system and assumes several tasks. For a semantic comparison, the analyser component searches activities or utilizations logged by the logger or tracker component, respectively, for patterns and creates or deletes the said interrelations in the repository. The data processing system can thereby dynamically and independently recognise and quasi learn interrelations between contents and their uses. With syntactic comparisons, the analyser component compares the actual content of a data inventory (content object) with text fragments which point to other data inventories (content objects).

The data processing system refers to external data inventories and uses the latter for the acquisition of interrelations. These can be entries in external databases, for instance emails or addresses, but also documents and objects of the data processing system itself. When the user follows an interrelation reference, the data set or the external document opens in the appropriate application. When the user accesses a data inventory via network connections, the document will open for instance in an additional browser window after it has been converted correspondingly by the data processing system.

The repository is the interface to data management. This is where interrelations and/or references to the data inventories (content objects) and their respective connections are managed. In FIG. 1, only one repository is shown in an exemplary manner. It is also possible, however, to integrate several repositories into the data processing system, so that for instance local, server-based interrelations and data inventories can be integrated into the respective user system.

Figure 4:
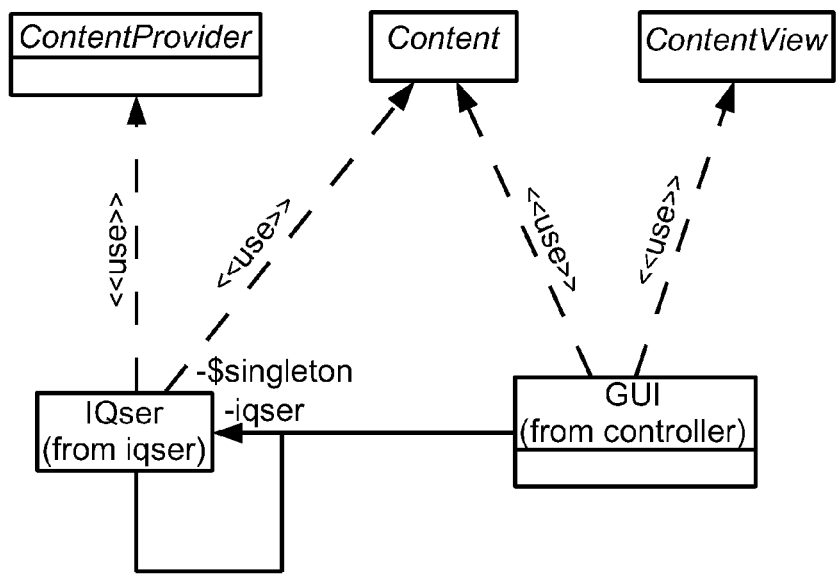
FIG. 4 shows another principal exemplary embodiment of a communication between selected components of the data processing system according to the invention according to FIG. 1.

The data processing system further comprises an interface for integrating data inventories in order to be able to process every conceivable type of contents in the form of data representing information. Since usually, not all possibilities and types of integration of data inventories can be predetermined in advance, the content provider component is implemented as a programmable interface in the present invention. This enables developers to individually program other content providers which can then be used by the data processing system. This programming interface is subsequently also referred to as plug-in and is shown in FIG. 4.

The plug-in (FIG. 4) consists of several objects which must be implemented by the developer:
 ContentProvider: This is the interface to the kernel and provides the methods required for processing contents.
 Content: The content object is the actual content. It is used to exchange contents between the components.
 ContentView: Interface to the GUI. This is used to implement the representation and the possible actions and uses of the contents, respectively.

Figure 5:
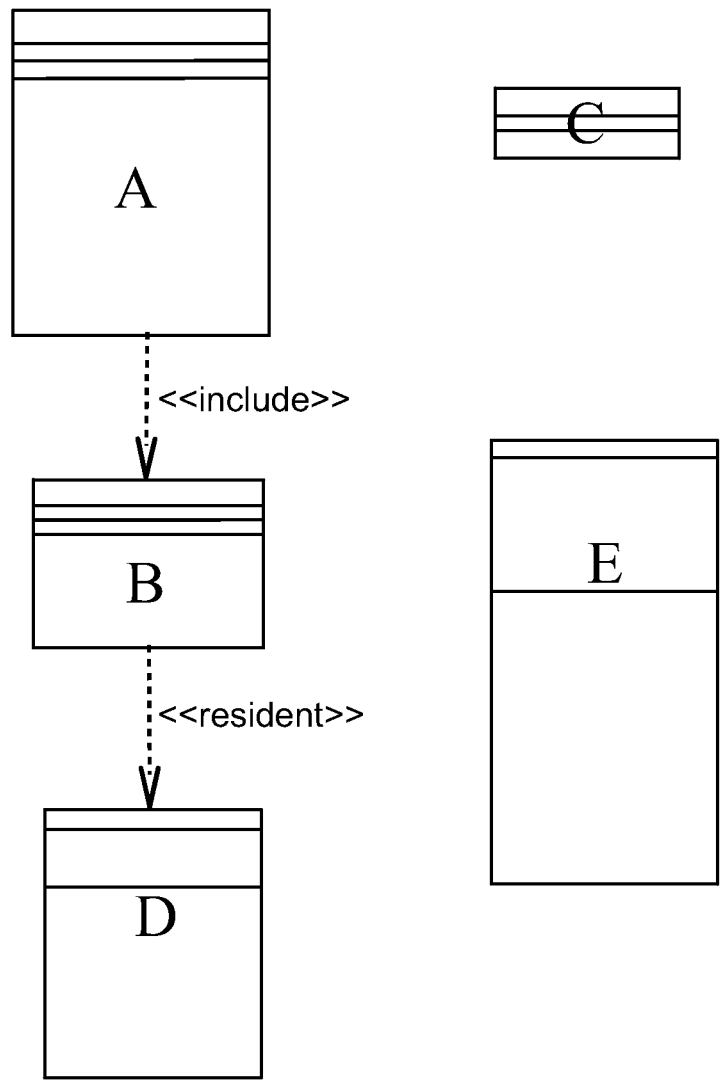
FIG. 5 shows a block diagram of a principal exemplary embodiment of a program implementation of a communication between selected components of the data processing system according to the invention according to FIG. 1.

As can be seen from FIG. 5, plug-ins are managed by two objects, the PluginManager and the plug-in. The PluginManager's task is to search for installed plug-ins when the IQser component of the data processing system is started, and to load and initialise existing plug-ins. The plug-in itself in the present invention is used as a data container. It contains a unit of the ContentProvider and the configuration of the respective plug-in.

For the development of a new plug-in, the developer must implement the objects ContentProvider, Content and ContentView. A plug-in is configured via a file (presently plug-in.xml) which must be present in the respective plug-in directory. If it is missing, the directory is not taken over as a plug-in by the component of the data processing system referred to as IQser in the present invention.

Figure 6:
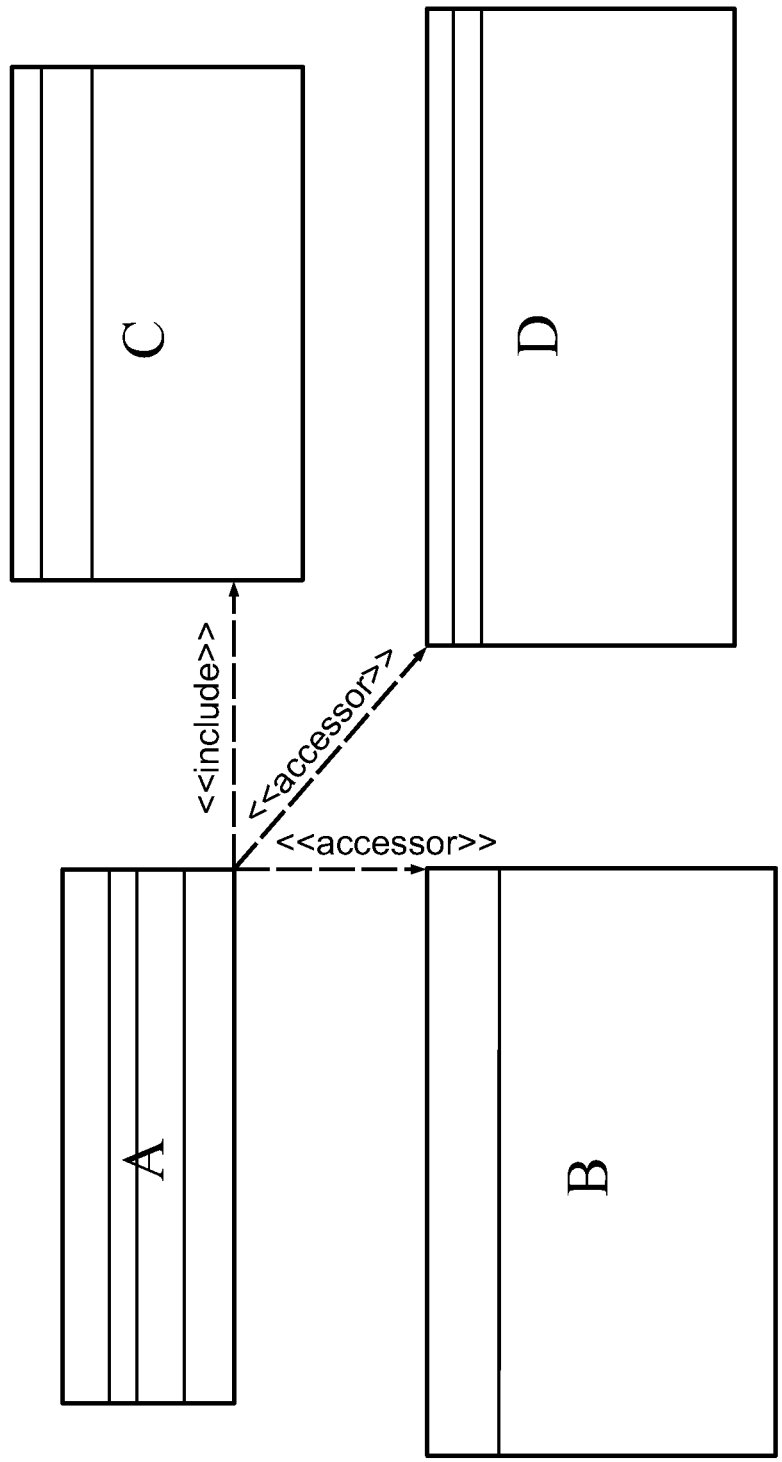
FIG. 6 shows a block diagram of another principal exemplary embodiment of a program implementation of a communication between selected components of the data processing system according to the invention according to FIG. 1.

FIG. 6 in an exemplary manner shows the processes realised by the crawler component which run in the background of the application of the data processing system. Herein, the data inventories are searched for new and modified contents, and these are memorized for analysis for instance in the form of a table. In the present invention, the processes are carried out with low priority in periodic intervals.

Figure 7:
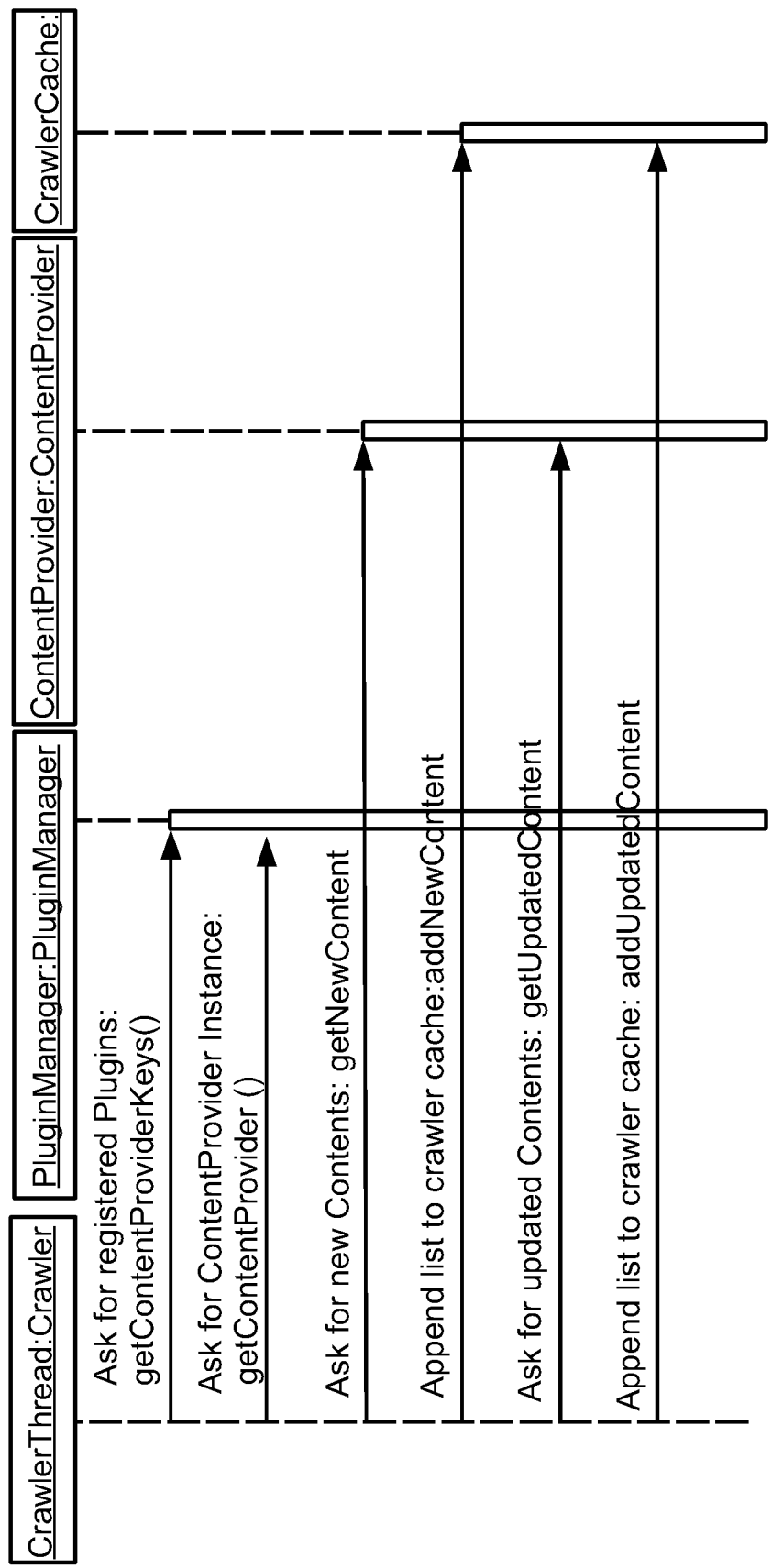
FIG. 7 shows principal details of the communication according to FIG. 6.

As can be seen on the basis of FIG. 7, the so-called crawler obtains the list of installed plug-ins from the PluginManager and processes them successively. In doing so, each ContentProvider of a plug-in is queried for new or modified content objects. The ContentProvider respectively returns a list with content IDs. These lists are then memorized by the crawler in a cache table. The table is then in turn processed by the analysers.

Figure 8:
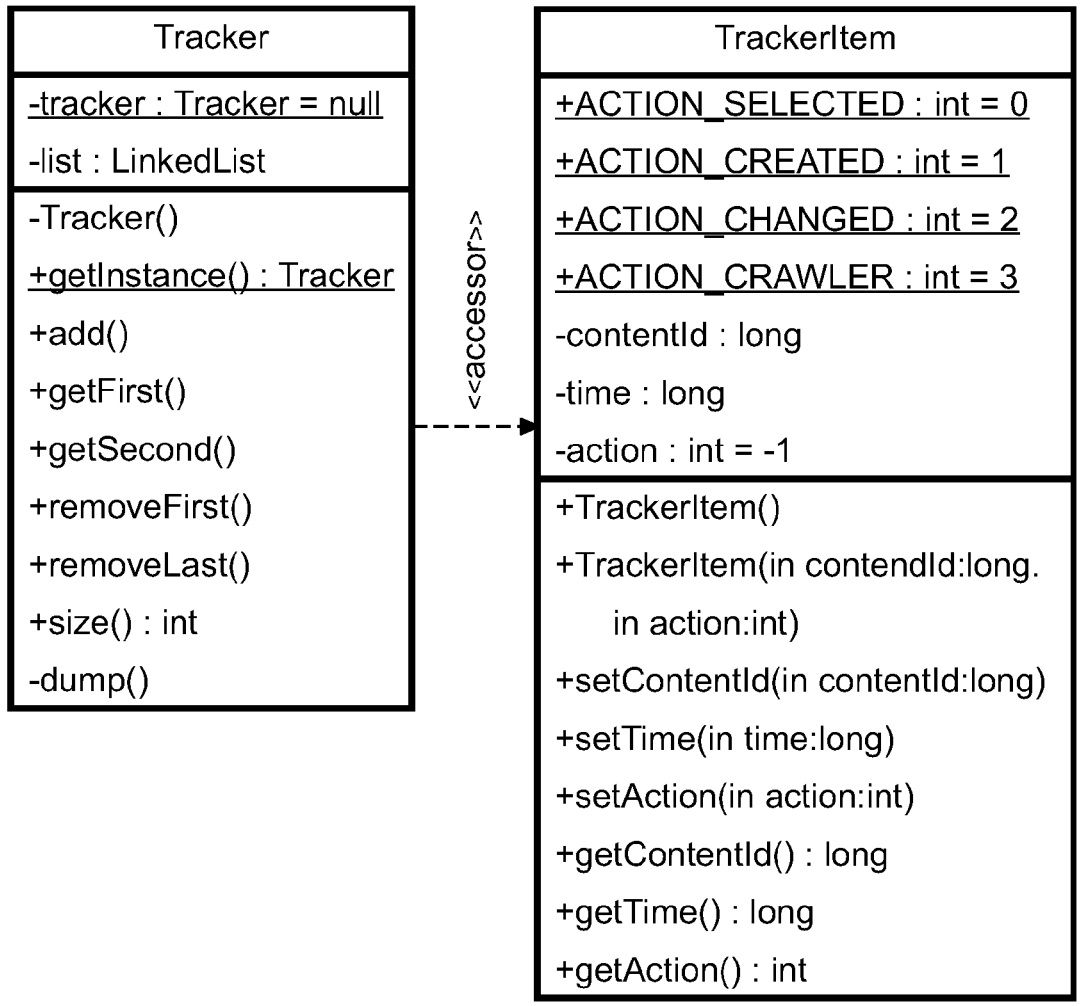
FIG. 8 shows a block diagram of another principal exemplary embodiment of a program implementation of a communication between selected components of the data processing system according to the invention according to FIG. 1.

The task of the so-called logger or tracker component shown in an exemplary manner in FIG. 8 is similar to that of the crawler component. The tracker or logger logs the actions of the user to content objects. By this logging operation, patterns in the processing and/or use of contents are later acquired by the InterestAnalyser and put to further use. In this manner, interrelations between contents can be created dynamically. These interrelations are weighted low and, as soon as they have not been used for a longer, pre-determinable period, are quasi forgotten by release. The period over which the tracker or logger is to log the activities can be configured. The shorter the period, the faster the processing. The longer the period, the higher the possibility to acquire processing or usage patterns.

Figure 9:
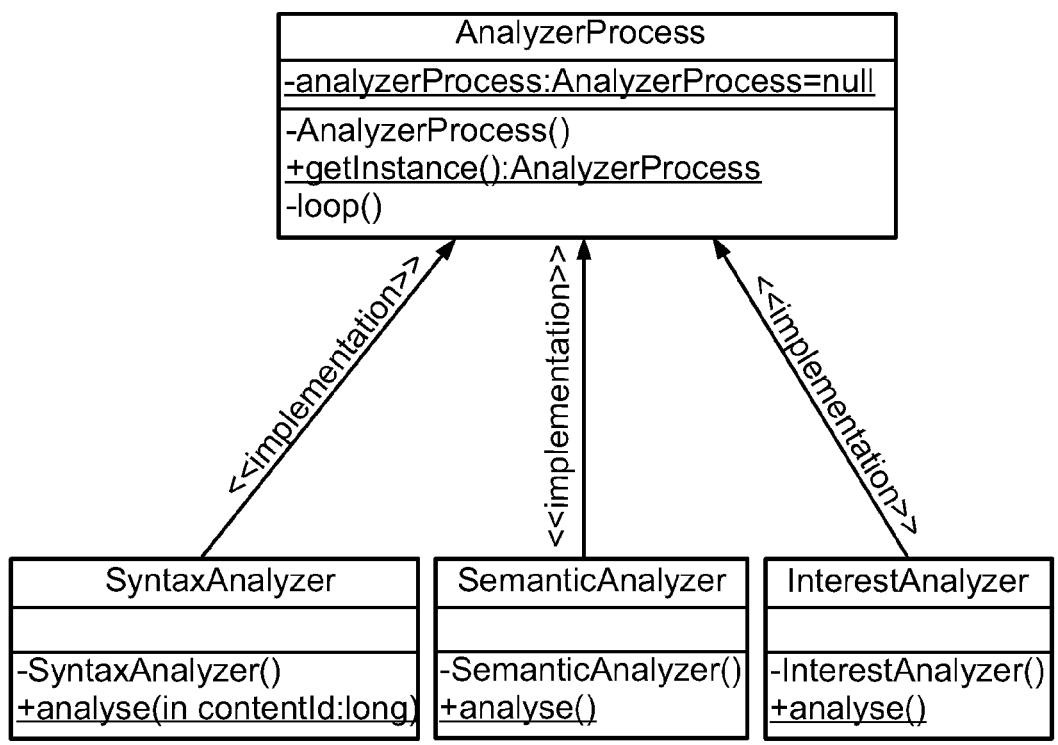
FIG. 9 shows a block diagram of another principal exemplary embodiment of a program implementation of a communication between selected components of the data processing system according to the invention according to FIG. 1.

The analyser shown in FIG. 9 is a process which analyses the contents "found" by the crawler in accordance with various criteria in the background of the data processing system. The analyser itself in the present invention consists of the following sub-components and -processes, respectively:

IndexAnalyser: Analyses the contents for keywords required for interrelation acquisition.

SemanticAnalyser: Analyses the contents according to semantic criteria in order to acquire interrelations between contents.

SyntaxAnalyser: Analyses the contents for syntactic interrelations with other contents.

InterestAnalyser: Analyses contents for patterns in processing or use by the user.

If at least two events have been entered in the log (tracker), an analysis can be started by calling the analytical process. For this purpose, the analyser views the first two entries of the log. If the second entry is not an event which was triggered by the selection (e.g. "for display") of an item of content, the syntax analysis will be started (cf. FIG. 11). If it was an interrelation (subsequently also referred to as selection), syntax analysis will be skipped. If both entries are events which were triggered by the user, each of the contents is examined both in the semantic and in the interest analyser in the present case. Subsequently, other analytical steps may follow. When all analytical steps have been carried out, the first entry is deleted. Now the entire process is repeated until only one entry is left in the log.

Figure 14:
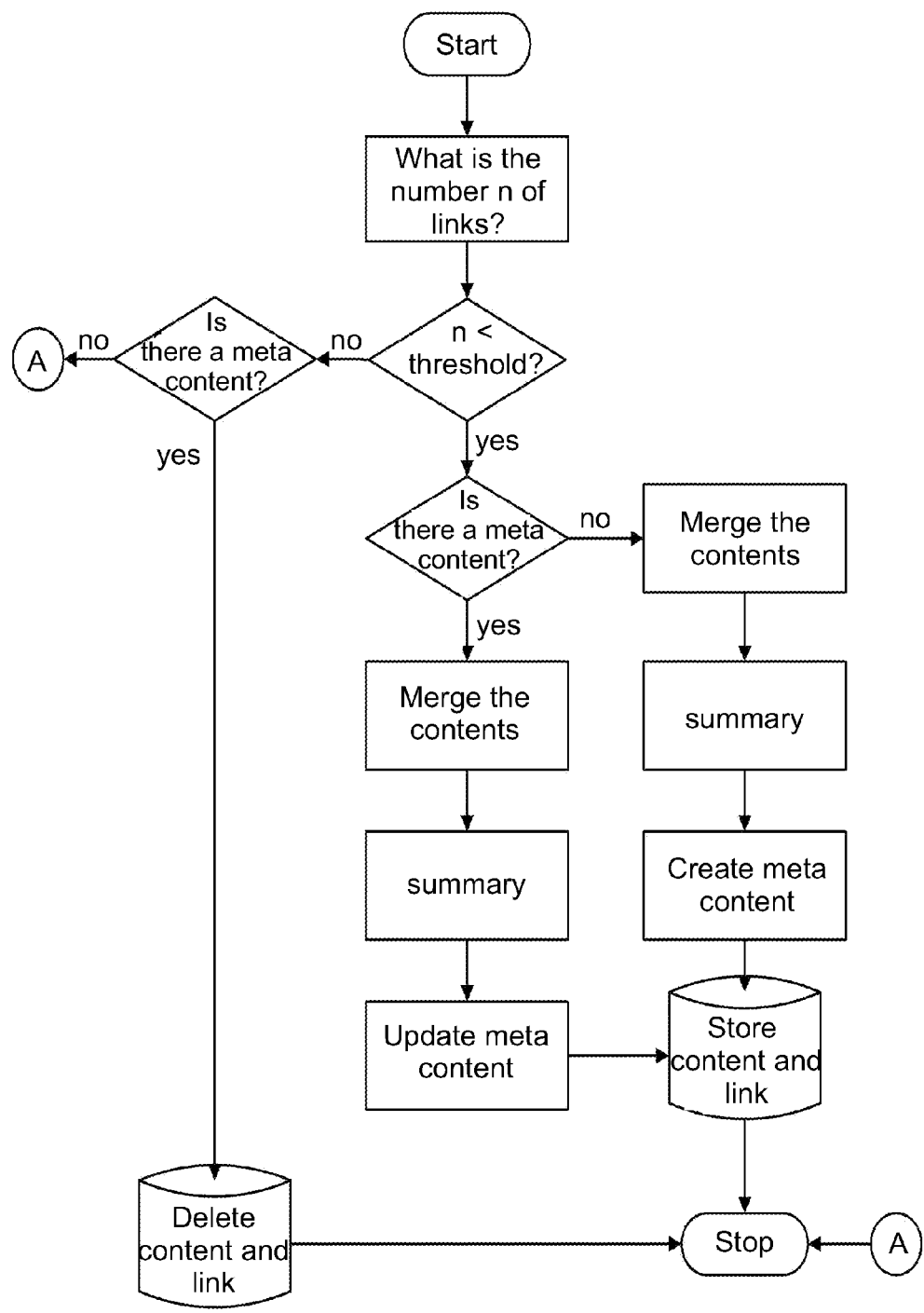
FIG. 14 shows a flow chart of another exemplary embodiment of an interrelation acquisition according to the invention.

FIG. 14 for instance shows the process of a so-called meta analyser. The meta analyser verifies whether the number of connections to an examined content exceeds a limiting value n. If not, it is verified whether there is a meta content which—if it exists—must be deleted. If the limiting value is reached, it is also verified at first whether there is a meta content. In both cases, all linked contents are merged and summarised. If there has already been a meta content, the latter is updated by the summary. If there has been no meta content, yet, it is created and deposited in a database.

Figure 10:
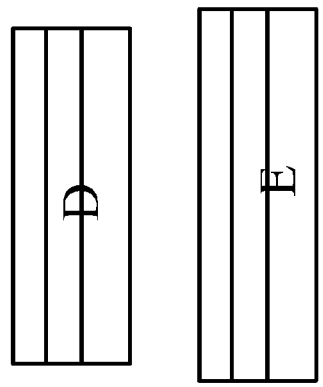
FIG. 10 shows a block diagram of another principal exemplary embodiment of a program implementation of a communication between selected components of the data processing system according to the invention according to FIG. 1.
Figure 10:
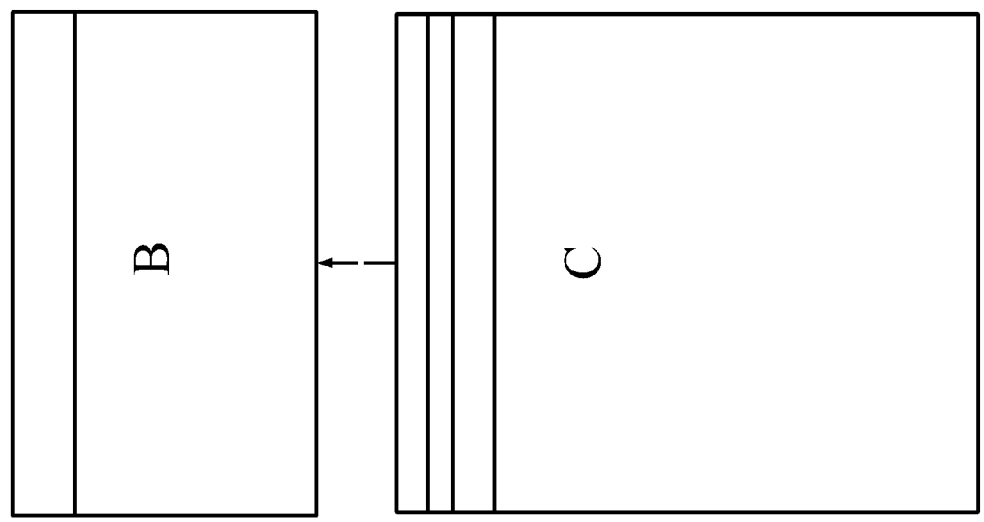
Figure 10:
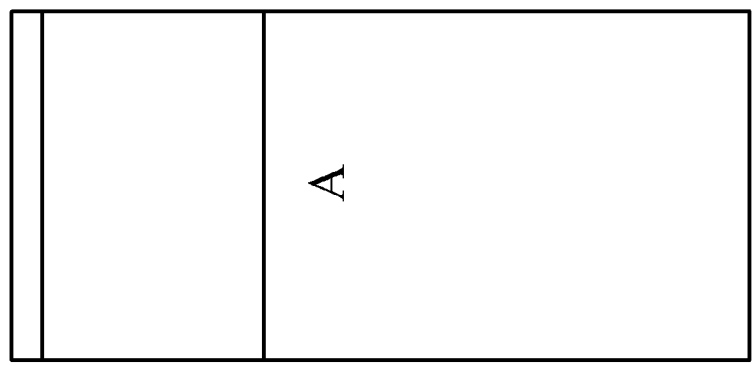
Figure 10B:
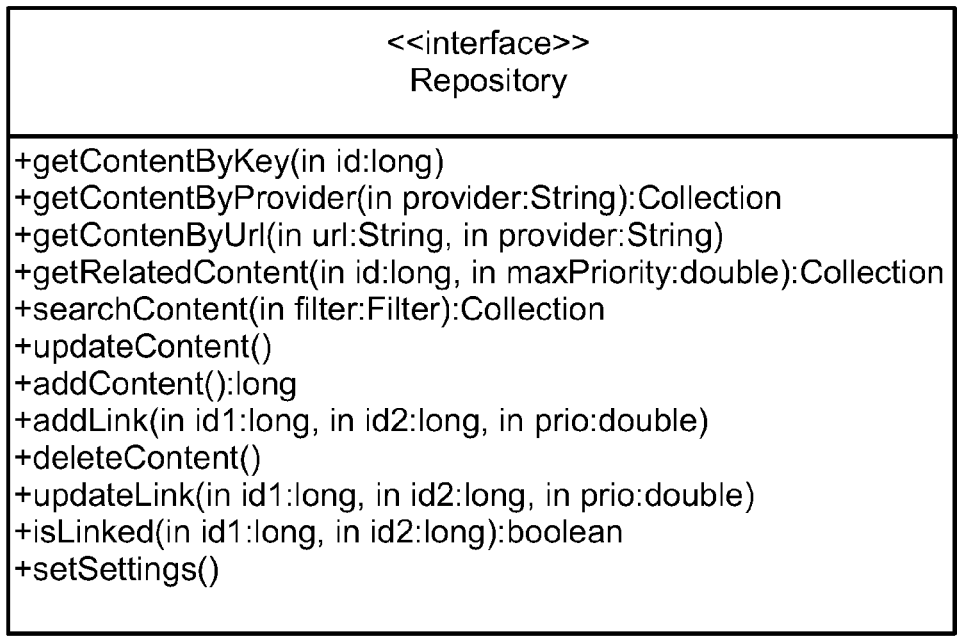
Figure 10D:
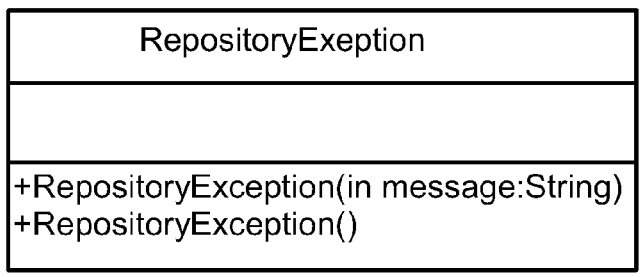
Figure 10E:
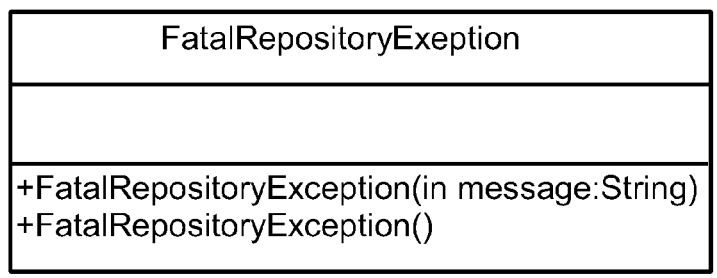

The repository shown in detail in an exemplary manner in FIG. 10 is the interface to the data inventories. It assumes the memorization of all data relevant for the kernel; in the present invention, these are in particular:

An index to all contents.

Interrelations or connections of contents to other contents.

Temporary information regarding the order of processing of contents by the user (tracker).

Temporary information on new and modified contents (crawler).

An index of all key values of the contents (weighting).

When the semantic analysis is started, it is verified whether a connection between the two contents already exists. If there is none, a connection with a low value larger than 0 is created for weighting. If a connection exists already, the SemanticAnalyser will query whether the weighting is smaller than 1. If this value is 1, the analysis is aborted, if it is smaller than 1, it is continued. Now the weighting of the connection is increased by a smallest value larger than 0. Subsequently, it is verified whether the resulting weighting is larger or equal to 1. If the value is smaller than 1, the semantic analysis is terminated. If the value is larger or equal to 1, the weighting is reduced to a largest value smaller than 1. Subsequently, all other existing connections are called, and their weighting is reduced by a factor corresponding to the reduction of the currently examined connection. After that, the SemanticAnalyser is terminated.

Figure 11:
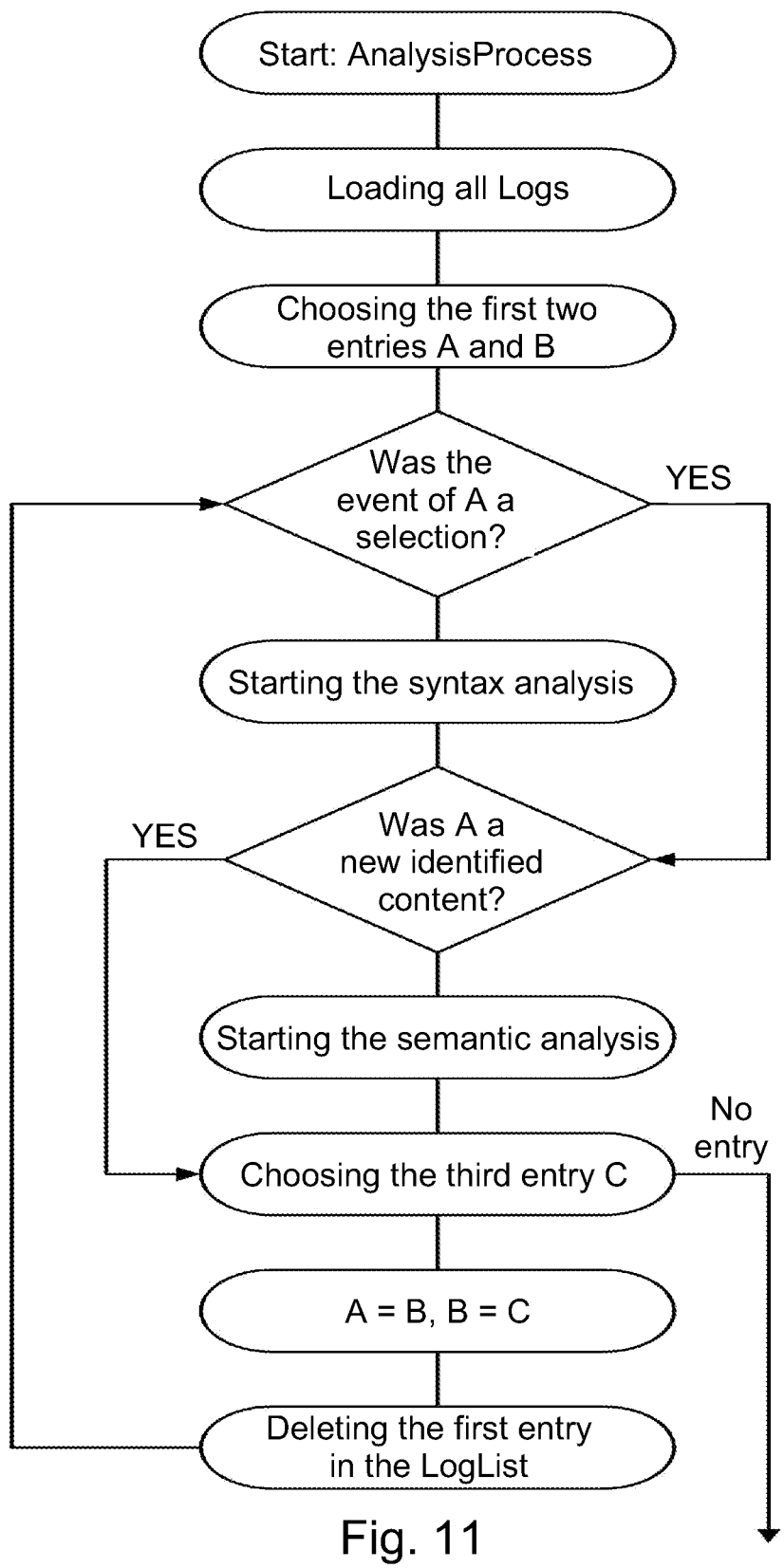
FIG. 11 shows a flow chart of an exemplary embodiment of an interrelation acquisition according to the invention.
Figure 12:
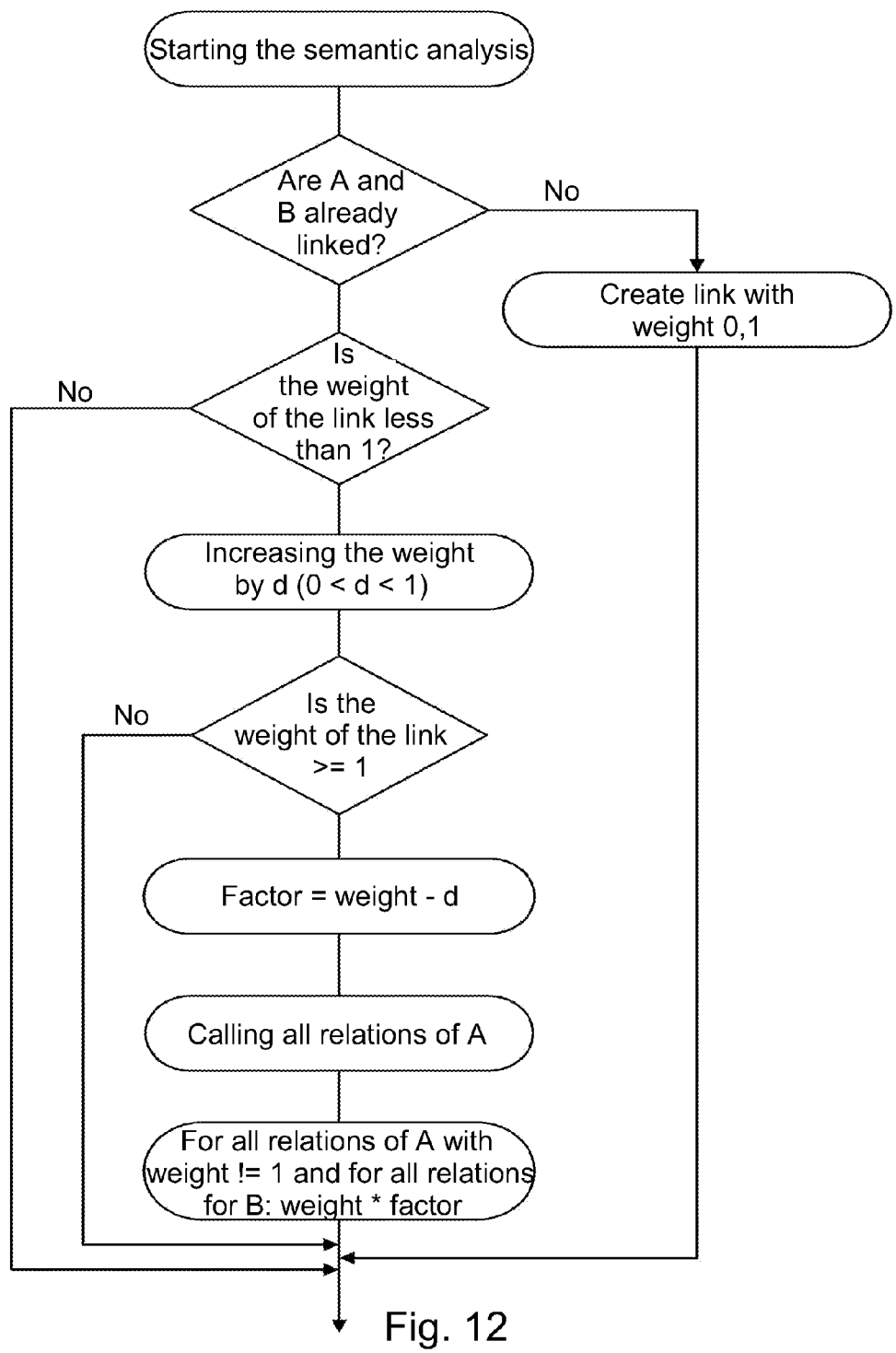
FIG. 12 shows a flow chart of another exemplary embodiment of an interrelation acquisition according to the invention.
Figure 13:
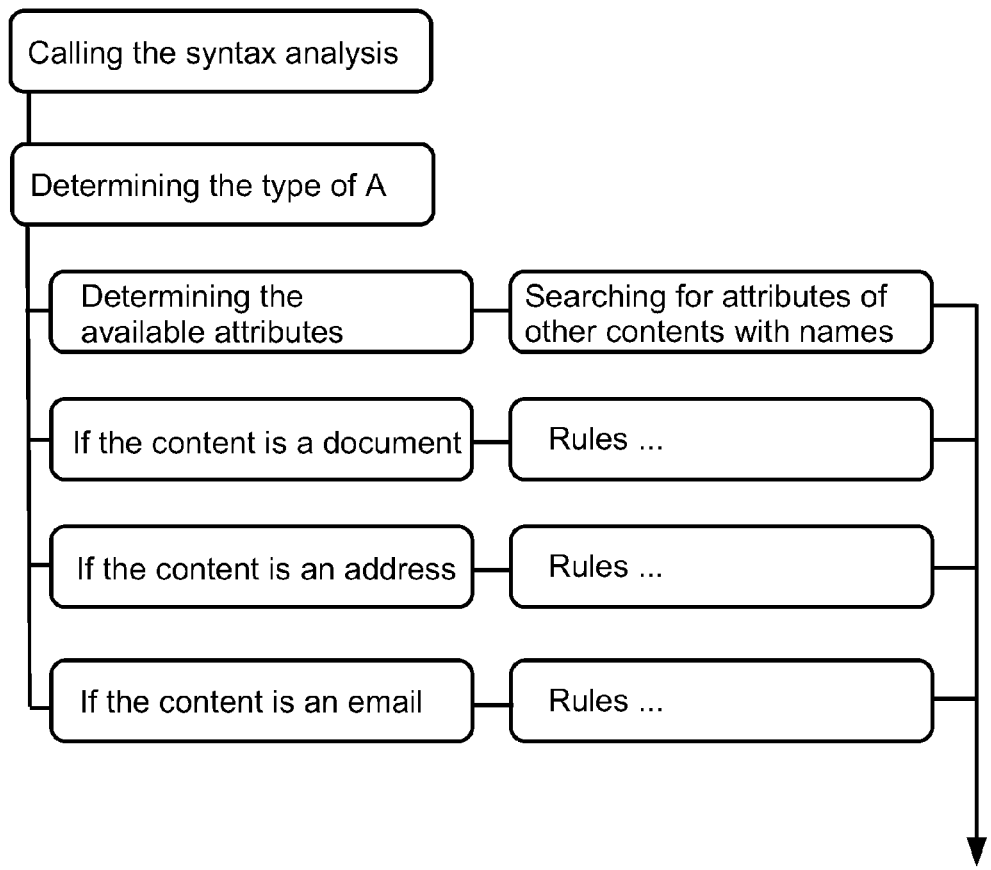
FIG. 13 shows a flow chart of another exemplary embodiment of an interrelation acquisition according to the invention.

FIG. 11 shows the iterative analytical process of interrelation acquisition. In the present invention, as already explained, various analytical processes are used in combination. Within the scope of interrelation acquisition, the analytical process is started by an entry in the tracker (event log), and is finished when only one entry remains in the tracker. As already explained above, it is the task of the analyser component to independently recognise the interrelations between the contents. For this purpose, the data processing system uses in particular a syntactical and a semantic analysis in combination. FIG. 12 shows the sequence of the processes explained above within the scope of a semantic analysis. FIG. 13 shows the principal structure of the processes within the scope of a syntactic analysis.

FIG. 11 shows the principal steps of the procedure realised by the analyser component. Within the scope of calling the analyser component, log files or the database entries (logs) are processed in the chronological order in which the individual items were written. If any entries have been processed in this manner, they are deleted from the list, while at least the last action is saved, however. The length of the list of actions in the log file or the database table also depends on how fast the analyser works, or how much computational throughput is assigned to the secondary thread. The thread of the IQser component or the actions carried out by the user of the data processing system, respectively, always have priority. As soon as a new action is written to the log file and the analyser has not been active yet, the analysis for interrelation acquisition is started. The following situations can lead to a call of the analyser:

At the start of the data processing system, at least two entries from the last session are already in the log.

The crawler has identified new contents, for instance by a new plug-in.

The user creates a new content.

The user selects an item of content from a called list.

The SyntaxAnalyser determines the rules for syntax analysis by calling the "keys" for the specific content to be searched. These "keys" are attributes describing which information modules (data fields) and data types are to be used for determining contexts. From the keys, the analyser compiles a filter which triggers a search through the entire acquired data inventory. Finally a connection is created to the contents found which, depending on the implementation and the requirements of the user, is weighted with 1 or a largest value smaller than 1, or the hit accuracy.

As explained above, all contents can be linked in interrelations with any type and any number of other contents. Interrelations are possible both in a cross-category manner and within one category. For instance, addresses can be linked with addresses, but addresses can also be linked with projects. There is no hierarchical order. The data processing system differentiates static and dynamic connections for interrelations or their acquisition, respectively. Static connections are always displayed and can be produced and edited by the user. Dynamic connections are automatically created by the system with a weighting. The following are the criteria for weighting:

The frequency of calling a content.

The frequency of calling of contents in the context created by the interrelation.

The age of the last call of the interrelation or of the linked contents.

Search results of an interrelation request are furthermore weighted according to the frequency of the searched content in the respective interrelation.

As already explained, there is an internal threshold value beyond which a dynamic connection is displayed or not. The value (weighting) changes in dependence on the user behaviour or the evaluation of the log of all actions carried out by the user with the data processing system, respectively.

The interrelations are represented as dynamically linked objects in the data processing system.

Figure 15:
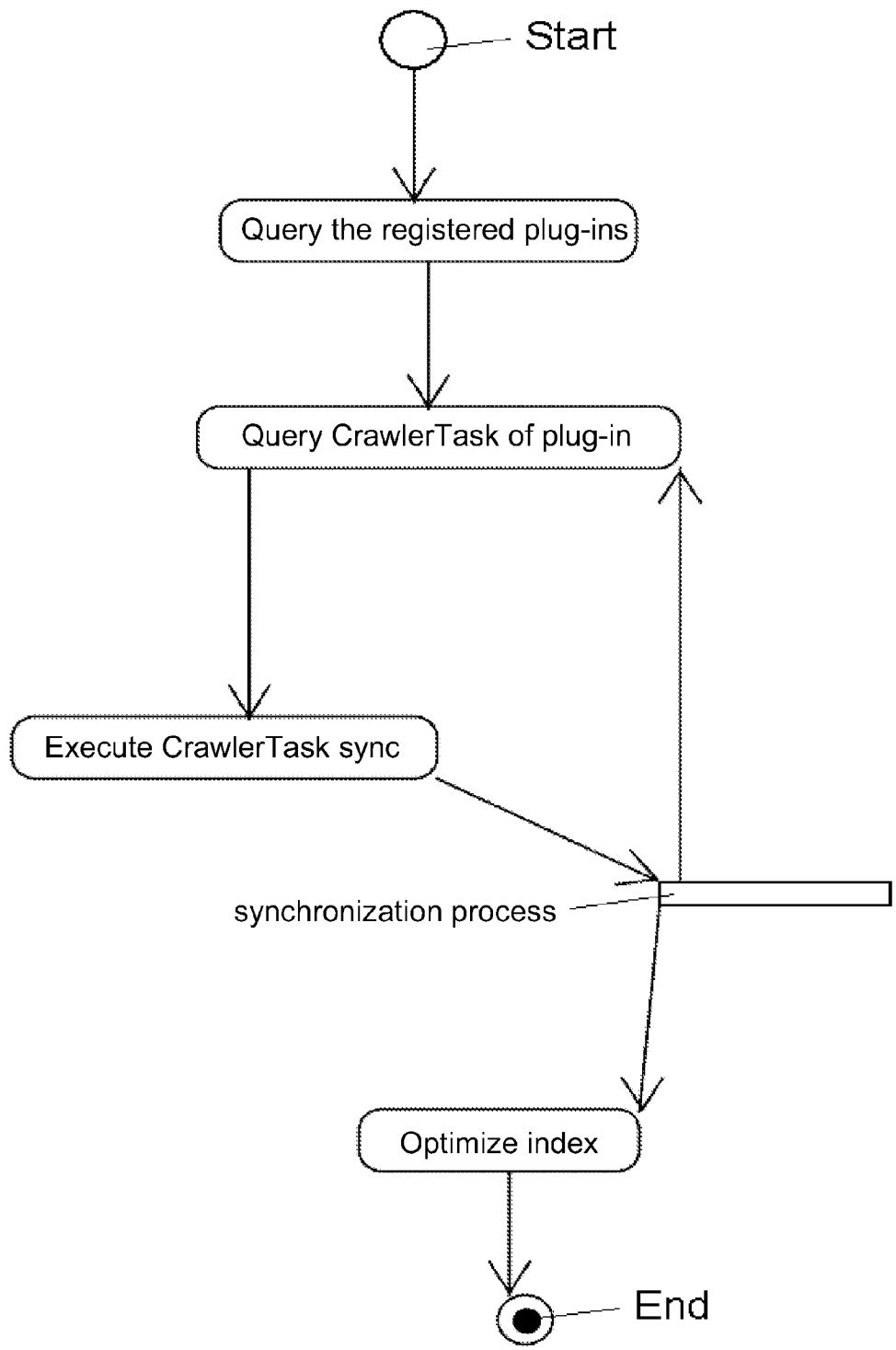
FIG. 15 shows a flow chart of another exemplary embodiment of an interrelation acquisition according to the invention.

FIG. 15 shows and describes in an exemplary manner how the corresponding plug-in is queried for a crawler task for identification of new contents. From a technical point of view, this subsystem realising synchronisation processes is a so-called class which queries the respective data sources of the plug-in for new, deleted or generated interrelations.

Figure 16:
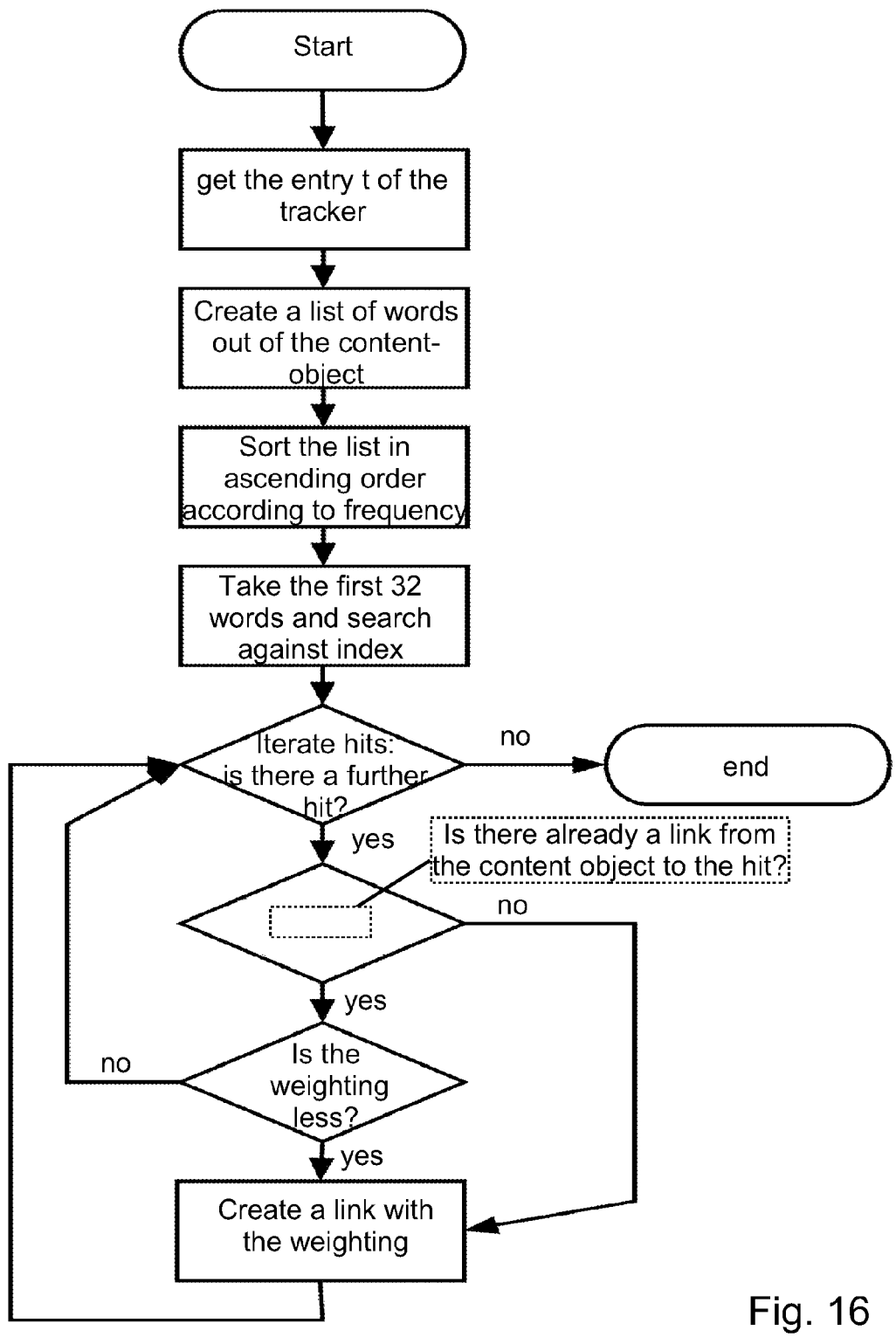
FIG. 16 shows a flow chart of another exemplary embodiment of an interrelation acquisition according to the invention.

FIG. 16 shows and describes in an exemplary manner how an analysis of full texts according to the invention within the scope of an acquisition of interrelation according to the invention takes place, wherein at least one word from a list (list of words) of words contained in the full text that has been made from a full text is used as the at least one item of data representing at least one item of information of the request for an interrelation (interrelation request). The list of words made from a full text in the pattern analysis will be arranged in an ascending manner in accordance with the frequency of the words. The first 32 words of the list resulting from this will be sent as search query—i.e. a request for an interrelation (interrelation request)—to a full text of a search engine. As a result a list of the similar documents with a weighting determined by the search engine will be delivered. Subsequently, it will be respectively verified in the further analysis whether there is already a connection of the full text with the search hit. If this is the case, the higher weighting will be taken over. If this is not the case, a connection will be established and the weighting of the search result will be taken over.

The data processing system according to the invention further provides a cross-device man-machine interface for display, editing and control of complex contents or data inventories and their interrelations, in particular in order to satisfy the requirements with regard to a transparent control for modification of large data inventories and their interrelations and to make such a control comprehensible in particular for the untrained user and to facilitate it in comparison to other systems. The logic and ergonomics used by the man-machine interface are advantageously independent of the data processing devices or terminals used for or together with the data processing system according to the invention, for instance their output units such as monitors or displays.

The man-machine interface of the data processing system according to the invention advantageously enables an action-oriented control of the data processing system. The action-oriented control of the data processing system according to the invention replaces the functional menu control of computer-based programs usually used today. A functional menu control offers a selection of functions which are grouped in accordance with abstract criteria and are accessible in menu trees. Such abstract criteria are for instance "File" and "Edit" for the Windows operating systems of the company Microsoft. In comparison, the action-oriented control according to the invention—also referred to as action-oriented navigation—operates with context-sensitive options for action which have a binary structure in any application situation of the system. The binary structure relates to an input on the one side and an output of contents on the other side, or to authoring or modifying and displaying data inventories. The binary options for action are advantageously adjusted dependent on the respective action context, i.e. new options for action can be added in dependence on the respective action context, and/or other options for action can be omitted. The binary action-oriented control can advantageously be applied simultaneously to all output media, for instance with small displays of mobile terminals or with voice input and/or output, for which purpose the data processing device advantageously comprises a microphone and a speaker as input and output units.

The control or navigation through complex data inventories and their interrelations is advantageously realised by the man-machine interface of the data processing system according to the invention by a graphic user interface which serves to enter and/or reproduce interrelation requests, connections, interrelations, and/or interrelation weightings. Herein, the graphic user interface is configured for entering, modifying and/or reproducing data representing information in at least one data inventory.

The graphic user interface partitions the display area provided for reproduction by a display device into three areas, wherein in a first area, data representing information in at least one data inventory accessible via at least one data source, in a second area, at least one item of data representing at least one item of information of an interrelation request, and in a third area, at least one acquired interrelation between the item of data representing at least one item of information of the interrelation request and the item of data representing at least one item of information of the data inventory is reproduced.

The partitioning according to the invention of the display area into three sub-areas is subsequently referred to as triadic window technique. While the window techniques known from the graphic interfaces of modern operating systems either operate with list, icon, or tree diagrams for representing the hierarchical structure of data and files of a computer system, the triadic window technique according to the invention operates with a horizontal or vertical tripartition of the available display area (window).

Figure 17:
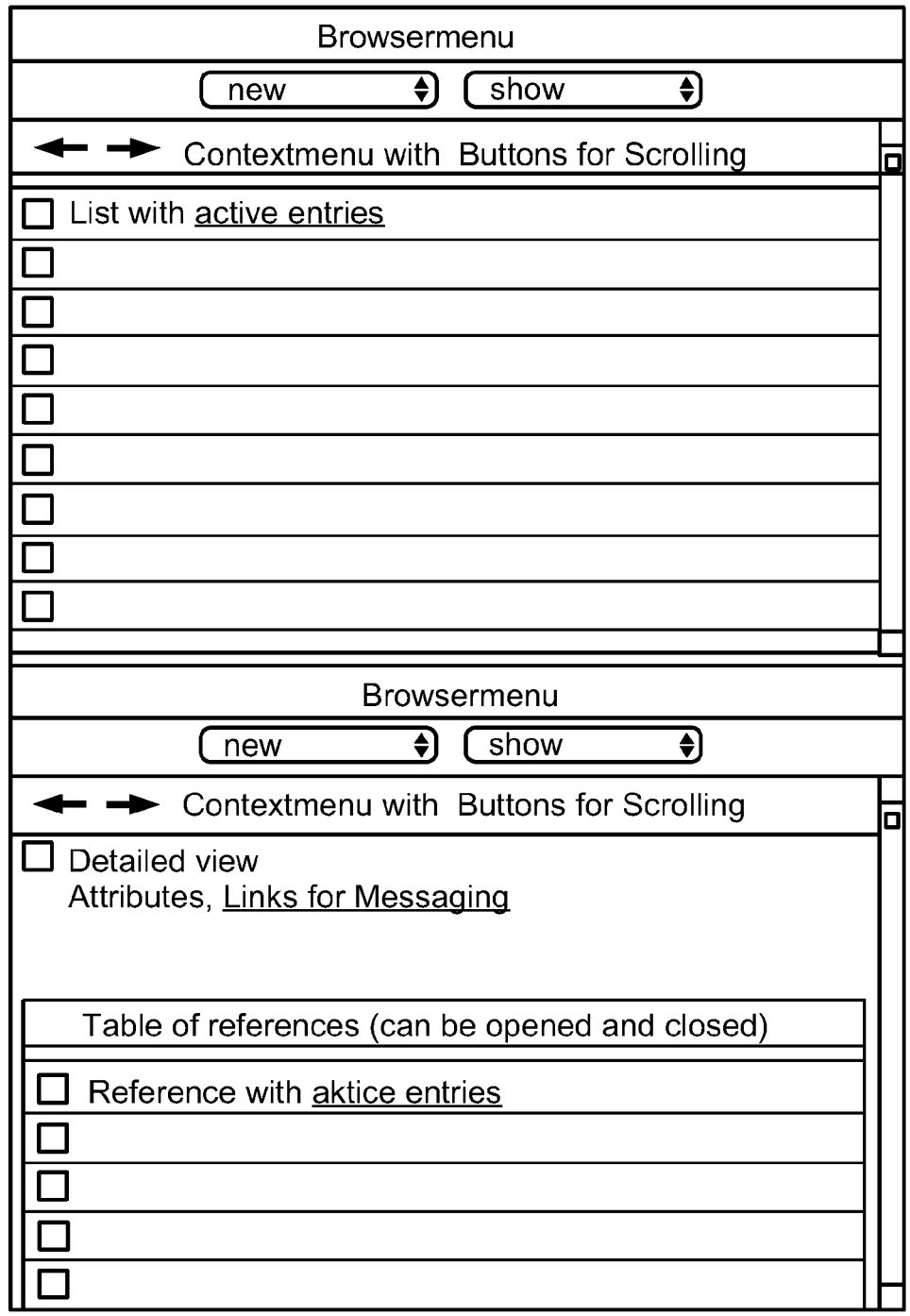
FIG. 17 shows a schematic diagram of a principal exemplary embodiment of a graphic user interface according to the invention for the use of a data processing system according to the invention.
Figure 18:
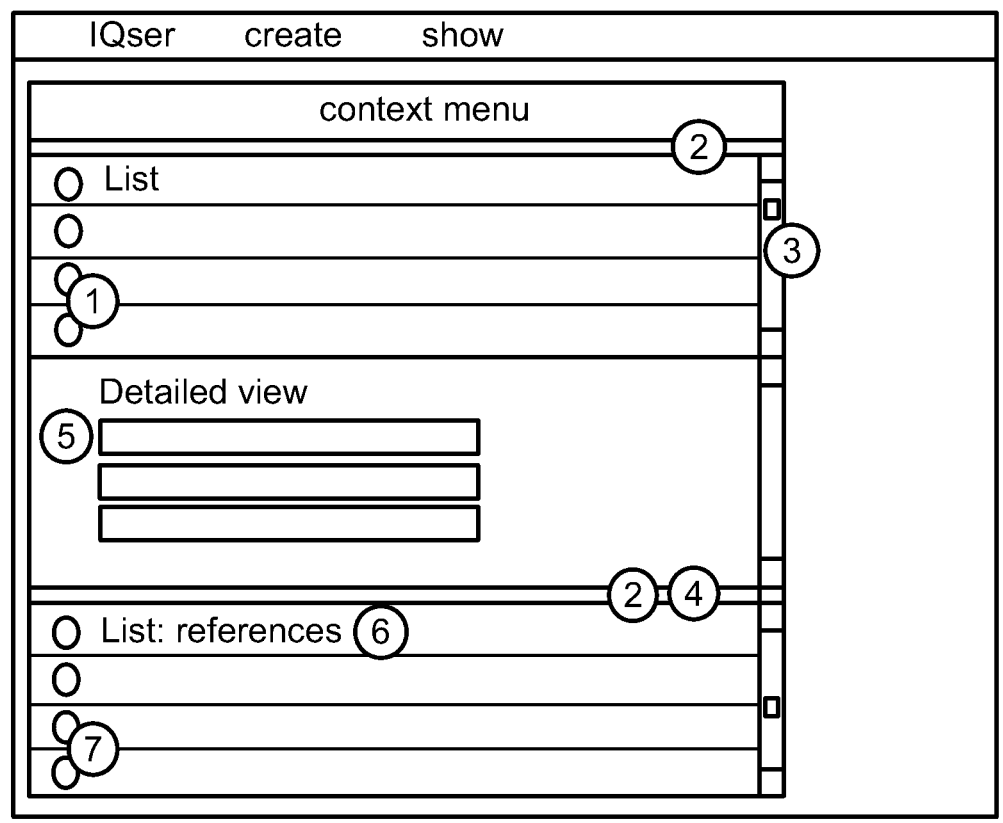
FIG. 18 shows a schematic diagram of another principal exemplary embodiment of a graphic user interface according to the invention for the use of a data processing system according to the invention.

A corresponding graphic user interface is shown in FIG. 17 and FIG. 18, in the present invention in the form of a principal example of a so-called Internet front-end, with a vertical partition of the display area. Herein, the data processing system according to the invention can be used in the form of a so-called web browser (FIG. 17) or a so-called JAVA client (FIG. 18).

With the vertical partition of the display area represented in FIG. 17 and FIG. 18, a selection of contents is shown as a list in tabular form for instance in the upper third of the display area (window), in the second third of the display area (window), there is a detailed view of an item of content selected from the first list, and in the last third of the display area (window), all contents linked with the selection are shown, which appear or are reproduced for instance also in a list. In this manner, the user can see at a glance which contents belong together and can continue navigation directly from there in order to search for contents or to derive knowledge from the interrelations. Epistemology shows that knowledge is generated by linking information. Thus, the data processing system according to the invention not only makes information transparent, but also knowledge. If the user selects an item of content from the list in the last third of the window, an animation will be advantageously started which shifts the last animation upwards, wherein the subsequently shown "triadic window" has the same structure and logic. Furthermore, the user can also navigate back, so that the animation is correspondingly reversed.

In another vertical partition of the display area not shown in the figures, for instance the result of a (selection) in the form of a list of contents can be seen in the upper third of the display area (window), the connections or interrelations to a selected content from the list of the first area are shown in the second third of the display area (window), and the last third of the display area (window) shows a preview of the selected content (item of data representing information). The preview reproduced in the third area of the display area may be better legible or visible if the proportion in size between the first two areas and the third area is variably adjustable, so-called "split plane". Control and navigation in this case are advantageously restricted to the first two areas of the display area, while the preview in the third area simply changes in the same place. The sequence of the window areas can vary depending on the implementation.

The advantage of the graphic user interface of the data processing system according to the invention is that the user can see at a glance which contents belong together and can directly continue controlling or navigating in order to search for contents or to directly derive knowledge from acquired interrelations. Herein, an endless control or navigation, respectively, is provided in accordance with the invention.

The fields marked with the reference numerals 1 to 7 in FIG. 18 have the following functionalities:

1: List entries can be dragged to the list of references by drag and drop in order to create a connection. A double-click will open the detailed view in a new window;
2: Column headers: A sorting criterion can be selected by mouse click;
3: Scroll bar in order to be able to completely view lists and detailed lists which cannot be displayed completely in the window area;
4: The area for the list can be moved, and even completely "folded up" with pressed mouse button;
5: The detailed list entry comprises scroll bars in order to be able to completely view lists and detailed lists which cannot be displayed completely in the window area;
6: Column positions provided with background functions, for instance an email address leads to a mask for writing an email and
7: References can easily be deleted by dragging them out of the window area by the mouse.

In the following, processes occurring within the scope of use of the data processing system and their realisation on the part of the respective user interface are described by way of example.

"Display a list"

In the application of the user interface (GUI), the user selects a menu item from the menu or navigation for displaying contents, for instance in order to view all of the latest projects. The list of menu items to be selected is similar to a bookmark list of a browser. In the data processing system according to the invention, however, the bookmarks do not refer to static pages or lists, but to dynamic interrelations. Correspondingly, this part of navigation will look different from user to user. In the present invention, the data processing system is realised as a JAVA client.

"Add attributes"

In order to add a new attribute to a content object, the user calls up the edit mode of a content object. In addition to the existing attributes, the user will find an empty field where he can enter a new attribute or select from an accompanying list. An address is an object for which the IQser suggests attributes:

Since in the Java client, edit and view mode are not differentiated, it is advantageously proposed for this variant to supplement the navigation "new" with the option "Add attribute". If external data sources are used, the additional attributes will be memorized in the IQser.

If the user selects the option "module" (or a different designation) in the menu, a new empty module is shown in the detailed view. The designation is also empty. Advantageously, an additional selection box with the previously defined modules is provided. Subsequently, the data processing system advantageously verifies whether this designation already exists for a module, and corrects any typos or redundancies, if required.

Figure 19:
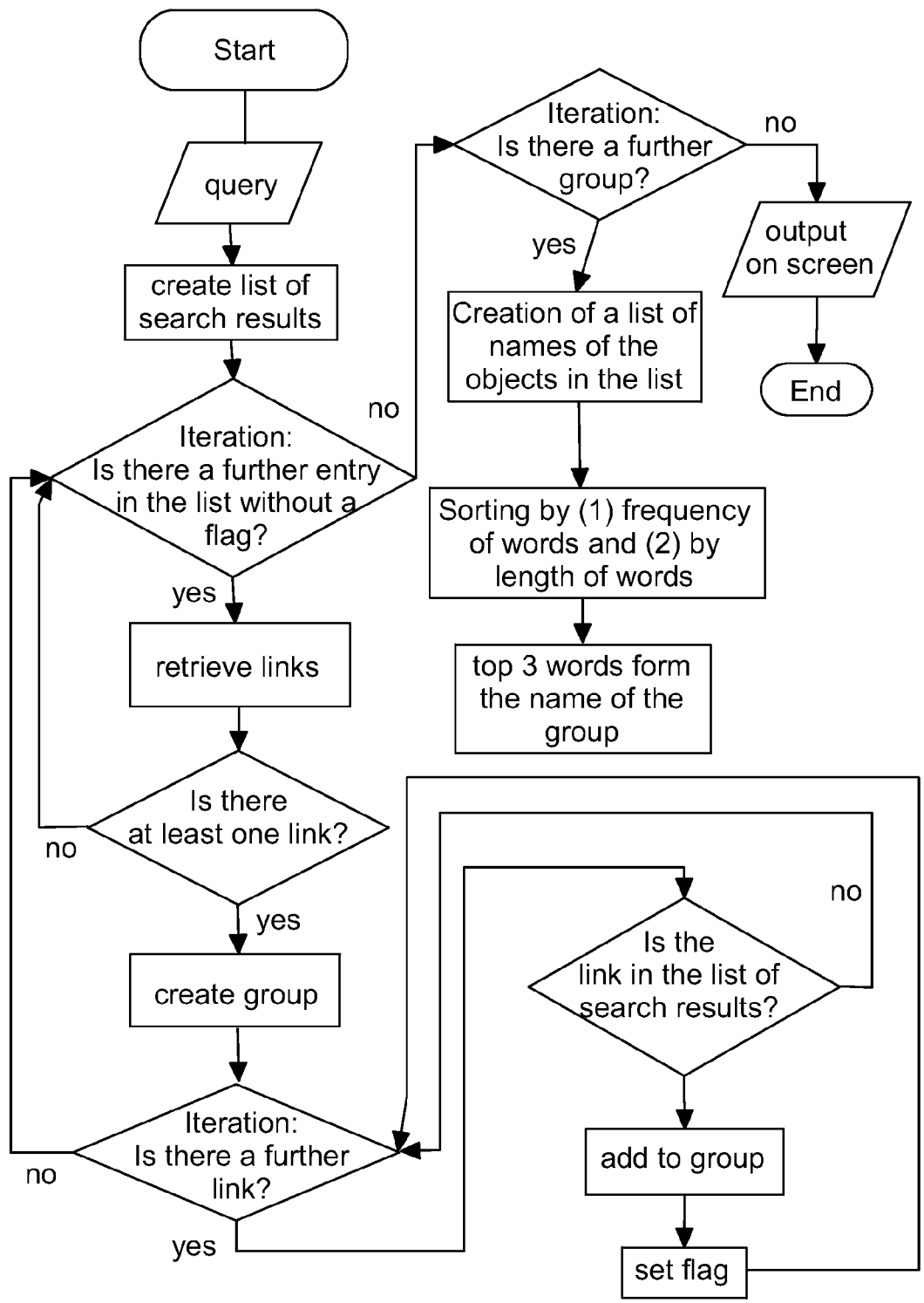
FIG. 19 shows a flow chart of an exemplary embodiment of a grouping of results according to the invention within the scope of an acquisition of interrelations according to the invention.

FIG. 19 shows and exemplarily describes the development of a grouping of results (content object) according to the invention within the scope of an acquisition of interrelations according to the invention, in the following also referred to as clustering of search results. Herein, search results are iterated step by step within the scope of the analysis of these ones. For each search hit the links are queried. If there is at least one link which is also a component of the search result, a group will be created. All such links will then be added to this group which are also part of the search result. The results (content object) of the group will no more be considered during the following iteration. The name of the group will be determined from the three longest and most frequent terms of the names of the allocated content objects.

Figure 20:
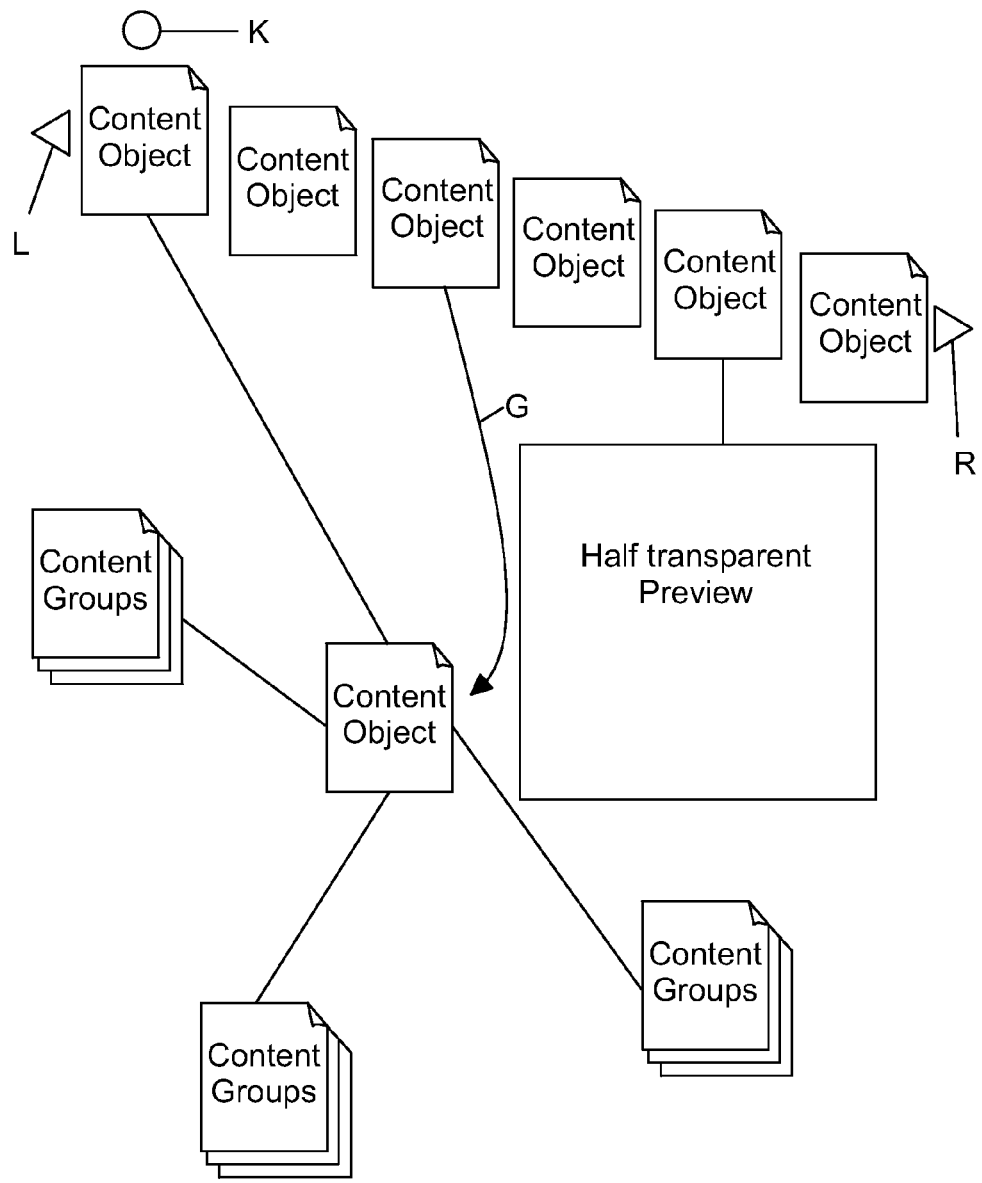
FIG. 20 shows a schematic diagram of an exemplary embodiment of a graphic reproduction of groupings of results according to the invention within the scope of an acquisition of interrelations according to the invention.
Figure 21:
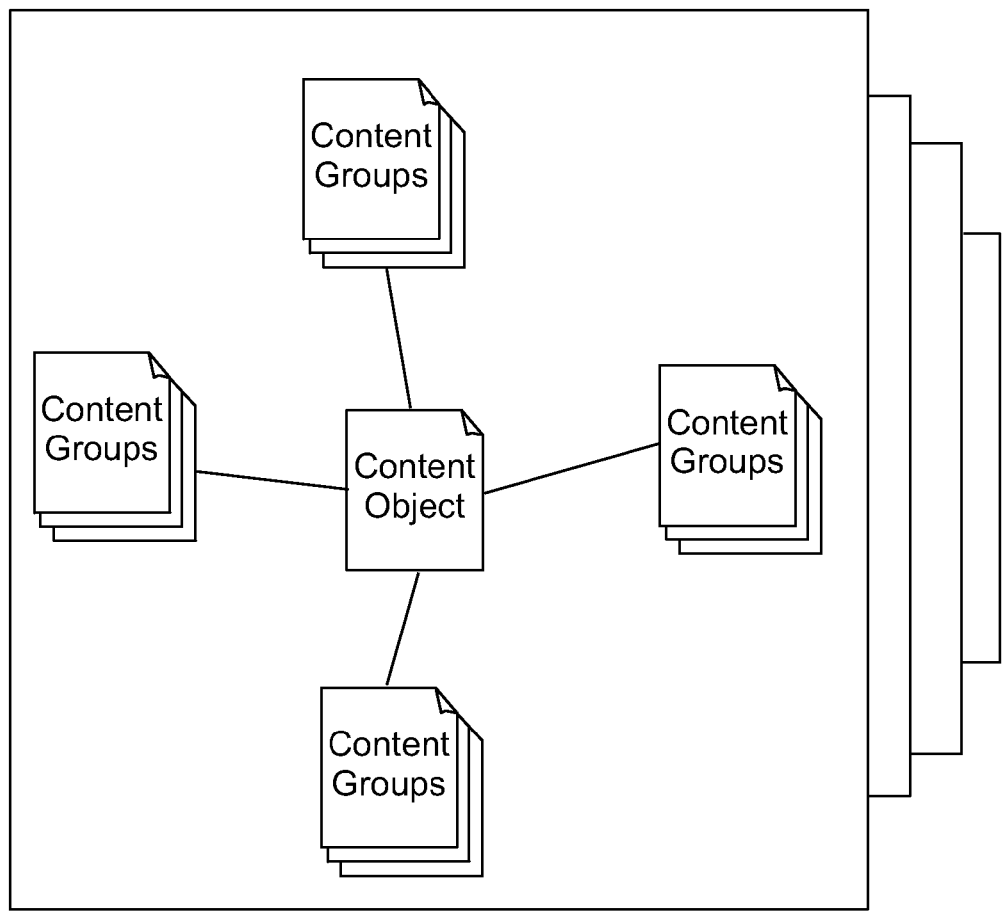
FIG. 21 shows a schematic diagram of an exemplary embodiment of a graphic reproduction of groupings of results according to the invention within the scope of an acquisition of interrelations according to the invention and FIG. 22 shows a flow chart of another exemplary embodiment of an acquisition of interrelations according to the invention.

FIG. 20 and FIG. 21 respectively show a schematic diagram of an exemplary embodiment of a graphic reproduction of groupings of results (content object) within the scope of an acquisition of interrelations according to the invention. Herein, the acquisition of interrelations is advantageously realised by means of an interrelation request addressed as request to a search engine.

FIG. 20 shows the graphic display of links to a result (content object). Herein, grouped relations are displayed in stacks in a network graphic. Each stack can represent a group, for instance the object type, if the grouping is realised according to types, or the subject, if the grouping is realised according to subjects. This provides an improved overview of the interrelations according to the interrelation request. In the present invention, a stack opens with an animation by means of a mouse click. In the present embodiment, up to five results (content objects) will be displayed by means of the optical display device of a data processing system or a data processing device. The two arrows referenced by "L" and "R" in FIG. 20 at the beginning and at the end of an extended stack are configured as buttons in order to enable navigation through a stack, preferably by so called scrolling. A click on the button referenced by "R" for instance leads to a little animation which shifts the results (content object) of the respective group to the left, such that five new or other results (content object) of the group will be reproduced. Of course, navigating through a stack only makes sense if this one comprises more than five objects. The circle referenced by "K" in FIG. 20 and placed above a first result, in the present case for instance a document, indicates a provided button, by means of which the stack can be compressed back into its original form by actuation, preferably by a so called mouse click with a mouse or a like input with an input device.

If the mouse pointer of the mouse is on one of the objects in a stack, a preview (in FIG. 20 referenced by "half transparent preview") of the result (content object) will be opened. A mouse click leads to an animation which is symbolically indicated by the arrow referenced by G in FIG. 20. Herein, the entire displayed graphic, apart from the selected result (content object), is represented in a faded manner and the selected result (content object) is shifted into the centre of the image in an animated way. Afterwards, the links of the selected result (content object) will be faded in. A double click onto a corresponding result (content object) of the selected result (content object) opens the full view of the same one, for instance with a corresponding program which has generated the result (content object).

An alternative possibility is represented in FIG. 21 and comprises the opening of a new level or view level which is in the present case preferably superposed in a three-dimensional representation. Thus, the user of the solution according to the invention can simply navigate back in that he returns to a former level. FIG. 21 illustrates the arrangement or use of corresponding levels.

Figure 22:
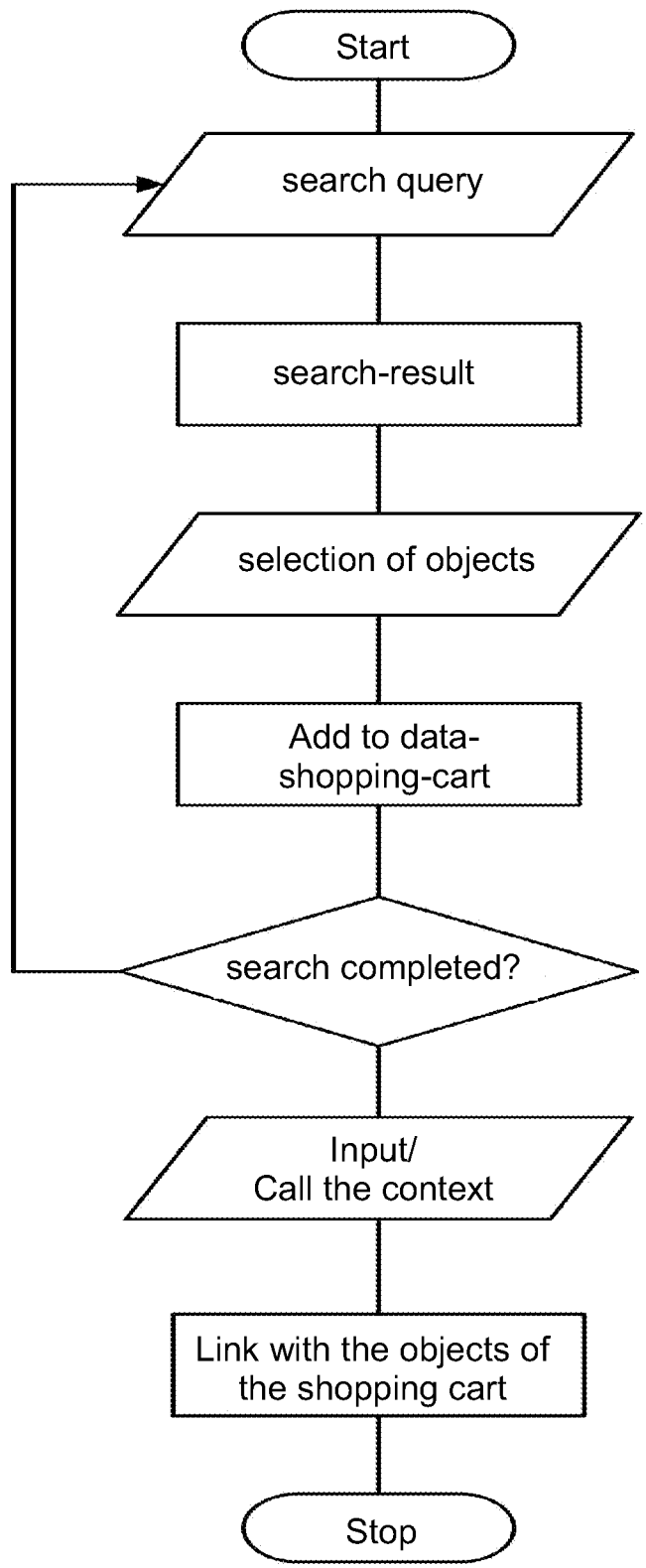

Another advantageous embodiment of the invention provides the use of an interrelation request within the scope of a method for researching information (information research), in the following also referred to as data shopping, as represented in FIG. 22. The IQser according to the invention manages information in several contexts. For researching information in a special working or process context, the data shopping according to the invention helps as follows: For each search result or each connection to a context (data object) the user can mark individual content objects and receive them in a virtual data shopping cart. In this manner, information will not get lost during a research. If the research is finished, the user can allocate the collected data objects to a context (data object). If the user for instance researches information which is required for a new project, he can simply collect it via a virtual shopping cart and afterwards allocate it to the concrete project. This means a substantial help in actively structuring information in a company or like applications.

The exemplary embodiments of the invention shown in the figures of the drawing and explained in connection with the description merely serve to explain the invention and are in no way restrictive.

What is claimed is:
1. A system for analyzing data to cluster search results based on interrelations between the search results, comprising:
   a data source;
   a data inventory in communication with the data source, wherein the data inventory comprises a plurality of objects, said plurality of objects including at least one data object, and at least one interrelation object including link statements that provide a link between interrelated data objects,
   wherein each link statement includes a reference to:
      first and second data objects of the data inventory;
      a weight value;
      a processor in communication with said data source and said data inventory;
      a query;
   software executing on said processor for establishing interrelation objects in said data inventory, said software utilizing interrelation requests,
   wherein each interrelation object is established based on at least one of syntactic comparison, semantic comparison, and pattern analysis to generate link statements representing interrelations between data objects of the data inventory,
   wherein said syntactic comparison includes:
      executing a search query with keys associated with a given data object,
      compiling at least one interrelation object that includes one or more link statements representing weighted interrelations for each search result of the search query, and
      storing the at least one compiled interrelation object in said data inventory;
   wherein said semantic comparison includes:
      retrieving a previously user selected object in said data inventory represented by a data object from a tracker of user actions,
      compiling or modifying at least one interrelation object that includes one or more link statements representing a weighted interrelation between the previously user selected object and a given data object, and
      storing the at least one compiled or modified interrelation object in said data inventory;
   wherein said pattern analysis includes:
      extracting a list of words associated with a given data object,
      sorting the list of words in ascending order according to their frequency,
      executing a search query with a defined number of top words,
      compiling at least one interrelation object that includes one or more link statements representing weighted interrelations for each search result of the search query, and
      storing the at least one compiled interrelation object in said data inventory;
   software executing on said processor utilizing said query to:
      compile a set of search results from data objects of said data inventory and;
      cluster said set of search results by performing an iteration routine over a result list comprising each data object of said set of search results,
      wherein the iteration routine includes:
         creating a subset of said set of search results, the subset comprising the data object and data objects from the set of search result determined to be interrelated to the data object based on one or more interrelations objects of said data inventory, wherein the data object and the data objects from the set of search results determined to be interrelated are removed from the result list such that the iteration routine is subsequently performed on remaining data objects and additional subsets are created thereby a user interface connected to said processor for presenting said clustered search results to a user.

2. The system of claim 1, wherein the iteration routine associates at least one created subset of data objects with a cluster.

3. The system of claim 1, further comprising software executing on said processor to determine if each of the plurality of search results is interrelated with any other of the plurality of search results; and form a cluster which includes the search result and any of the plurality of search results determined to be interrelated with the search result and which is not already part of a cluster.

4. The system of claim 1, further comprising software executing on said processor for labeling each cluster with at least one of the most frequent or longest terms within associated data objects.

5. The system of claim 1, further comprising software executing on said processor for labeling each cluster with a most significant term within content of associated data objects.

6. The system of claim 1, wherein a minimum relevance score is used to determine data objects from the set of search results are interrelated.

7. The system of claim 1, wherein the minimum relevance score comprises a threshold value.

8. The system of claim 1, wherein the query comprises a search string.

9. The system of claim 1, wherein the data source is accessible over a network.

10. The system of claim 1, wherein the user interface is a graphical user interface.

* * * * *